United States Patent
Bell et al.

(10) Patent No.: US 8,150,911 B2
(45) Date of Patent: *Apr. 3, 2012

(54) USER INTERFACE TO FACILITATE EXCHANGING FILES AMONG PROCESSOR-BASED DEVICES

(75) Inventors: Cynthia S. Bell, Chandler, AZ (US); Nathan Y. Smith, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/902,104

(22) Filed: Oct. 11, 2010

(65) Prior Publication Data

US 2011/0029604 A1 Feb. 3, 2011

Related U.S. Application Data

(60) Division of application No. 12/061,991, filed on Apr. 3, 2008, now Pat. No. 7,814,148, which is a continuation of application No. 10/228,822, filed on Aug. 27, 2002, now Pat. No. 7,376,696.

(51) Int. Cl.
*G06F 15/16* (2006.01)
*G06F 12/00* (2006.01)

(52) U.S. Cl. ...................................................... 709/203

(58) Field of Classification Search .................. 709/202, 709/203, 217–219, 250
See application file for complete search history.

(56) References Cited

U.S. PATENT DOCUMENTS

| | | | |
|---|---|---|---|
| 4,821,211 A | 4/1989 | Torres | |
| 5,024,571 A | 6/1991 | Shahar et al. | |
| 5,227,985 A | 7/1993 | DeMenthon | |
| 5,268,674 A | 12/1993 | Howard et al. | |
| 5,317,732 A | 5/1994 | Gerlach, Jr. et al. | |
| 5,408,333 A | 4/1995 | Kojima et al. | |
| 5,546,527 A | 8/1996 | Fitzpatrick et al. | |
| 5,608,860 A | 3/1997 | Fitzpatrick et al. | |
| 5,625,783 A | 4/1997 | Ezekiel et al. | |
| 5,644,736 A | 7/1997 | Healy et al. | |
| 5,729,255 A | 3/1998 | Aoki | |
| 5,801,700 A | 9/1998 | Ferguson | |
| 5,819,103 A | 10/1998 | Endoh et al. | |
| 5,838,317 A | 11/1998 | Bolnick et al. | |

(Continued)

OTHER PUBLICATIONS

"", Polling Technology, Accessed on Jun. 14, Answers.com, Online Dictionary, 1-2.

(Continued)

*Primary Examiner* — Zarni Maung

(74) *Attorney, Agent, or Firm* — Schwegman, Lundberg & Woessner, P.A.

(57) ABSTRACT

A first processor-based device (PBD), such as a personal computer functioning as a host and containing digital media files, may share a selected file with a second PBD. Media file-sharing may be facilitated by an automated technique including graphical user interfaces (GUIs). In one embodiment, when a device user wishes to transfer a file to another device, the user hovers the file over a particular desktop icon and drops it, causing it to be automatically transmitted to a corresponding destination. Optionally, in response to hovering, a software program automatically generates a GUI indicating potential destinations. The user then selects a destination, and the system automatically transfers the file to that destination. In another embodiment, media sharing can be initiated from a digital appliance, such as a digital picture frame, and a file can be sent to another PBD, such as another digital picture frame via an intermediary PBD.

24 Claims, 11 Drawing Sheets

U.S. PATENT DOCUMENTS

| | | | |
|---|---|---|---|
| 5,848,064 A | 12/1998 | Cowan et al. | |
| 5,862,325 A | 1/1999 | Reed et al. | |
| 5,886,699 A | 3/1999 | Belfiore et al. | |
| 6,023,241 A | 2/2000 | Clapper | |
| 6,031,830 A | 2/2000 | Cowan | |
| 6,044,382 A | 3/2000 | Martino | |
| 6,121,968 A | 9/2000 | Arcuri et al. | |
| 6,144,997 A | 11/2000 | Lamming et al. | |
| 6,147,683 A | 11/2000 | Martinez et al. | |
| 6,182,212 B1 | 1/2001 | Atkins | |
| 6,226,618 B1 | 5/2001 | Downs et al. | |
| 6,300,936 B1 | 10/2001 | Braun et al. | |
| 6,308,061 B1 | 10/2001 | Criss et al. | |
| 6,321,231 B1* | 11/2001 | Jebens et al. | 1/1 |
| 6,356,941 B1 | 3/2002 | Cohen | |
| 6,405,239 B1 | 6/2002 | Addington et al. | |
| 6,411,312 B1 | 6/2002 | Sheppard | |
| 6,453,336 B1 | 9/2002 | Beyda et al. | |
| 6,462,763 B1 | 10/2002 | Mostyn | |
| 6,466,238 B1 | 10/2002 | Berry et al. | |
| 6,489,950 B1 | 12/2002 | Griffin et al. | |
| 6,493,743 B2 | 12/2002 | Suzuki | |
| 6,538,665 B2* | 3/2003 | Crow et al. | 715/723 |
| 6,539,421 B1 | 3/2003 | Appelman et al. | |
| 6,590,601 B2 | 7/2003 | Sukeno et al. | |
| 6,628,304 B2 | 9/2003 | Mitchell et al. | |
| 6,643,506 B1 | 11/2003 | Criss et al. | |
| 6,675,213 B1 | 1/2004 | Schmonsees | |
| 6,704,031 B1 | 3/2004 | Kimball et al. | |
| 6,720,979 B1* | 4/2004 | Shrader | 715/723 |
| 6,721,578 B2 | 4/2004 | Minear et al. | |
| 6,735,434 B2 | 5/2004 | Criss et al. | |
| 6,781,606 B2 | 8/2004 | Jouppi | |
| 6,820,236 B1 | 11/2004 | Bates et al. | |
| 6,826,729 B1* | 11/2004 | Giesen et al. | 715/837 |
| 6,839,717 B1 | 1/2005 | Motoyama et al. | |
| 6,842,219 B2 | 1/2005 | Lee | |
| 6,850,209 B2 | 2/2005 | Mankins et al. | |
| 6,934,532 B2 | 8/2005 | Coppinger et al. | |
| 6,934,862 B2 | 8/2005 | Sharood et al. | |
| 6,944,700 B2 | 9/2005 | Bateman et al. | |
| 6,947,772 B2 | 9/2005 | Minear et al. | |
| 6,947,995 B2 | 9/2005 | Chang et al. | |
| 6,957,398 B1* | 10/2005 | Nayeri | 715/867 |
| 7,376,696 B2* | 5/2008 | Bell et al. | 709/203 |
| 7,426,532 B2 | 9/2008 | Bell et al. | |
| 7,460,140 B2* | 12/2008 | Hayashi et al. | 345/698 |
| 7,786,999 B1* | 8/2010 | Reid | 345/581 |
| 7,797,336 B2* | 9/2010 | Blair et al. | 707/773 |
| 2001/0019359 A1 | 9/2001 | Parulski et al. | |
| 2001/0033324 A1 | 10/2001 | Sukeno et al. | |
| 2001/0056434 A1* | 12/2001 | Kaplan et al. | 707/104.1 |
| 2002/0002562 A1* | 1/2002 | Moran et al. | 707/500 |
| 2002/0044149 A1 | 4/2002 | McCarthy et al. | |
| 2002/0046108 A1 | 4/2002 | Conrad et al. | |
| 2002/0054139 A1 | 5/2002 | Corboy et al. | |
| 2002/0062397 A1 | 5/2002 | Chang et al. | |
| 2002/0062398 A1 | 5/2002 | Chang et al. | |
| 2002/0069236 A1 | 6/2002 | Jahnke | |
| 2002/0073075 A1 | 6/2002 | Dutta et al. | |
| 2002/0075331 A1 | 6/2002 | Orbanes et al. | |
| 2002/0078101 A1 | 6/2002 | Chang et al. | |
| 2002/0080177 A1 | 6/2002 | Orbanes et al. | |
| 2002/0083121 A1 | 6/2002 | Chang et al. | |
| 2002/0087400 A1 | 7/2002 | Khoo et al. | |
| 2002/0087546 A1 | 7/2002 | Slater et al. | |
| 2002/0091739 A1* | 7/2002 | Ferlitsch et al. | 707/526 |
| 2002/0108118 A1 | 8/2002 | Cohen et al. | |
| 2002/0113803 A1* | 8/2002 | Samra et al. | 345/619 |
| 2002/0113861 A1 | 8/2002 | Lim et al. | |
| 2002/0120760 A1 | 8/2002 | Kimchi et al. | |
| 2002/0126137 A1 | 9/2002 | Kaestner, Jr. | |
| 2002/0129068 A1 | 9/2002 | Takasu et al. | |
| 2002/0150387 A1 | 10/2002 | Kunii et al. | |
| 2002/0180803 A1 | 12/2002 | Kaplan et al. | |
| 2002/0190946 A1 | 12/2002 | Metzger | |
| 2002/0194414 A1 | 12/2002 | Bateman et al. | |
| 2003/0055872 A1 | 3/2003 | Meidan et al. | |
| 2003/0097350 A1 | 5/2003 | ShamRao | |
| 2003/0191729 A1 | 10/2003 | Siak et al. | |
| 2003/0206194 A1 | 11/2003 | Boyd | |
| 2003/0212616 A1 | 11/2003 | Castrogiovanni et al. | |
| 2003/0220914 A1 | 11/2003 | De Angelis et al. | |
| 2003/0227478 A1 | 12/2003 | Chatfield | |
| 2004/0012627 A1 | 1/2004 | Zakharia et al. | |
| 2004/0032936 A1 | 2/2004 | Horel et al. | |
| 2004/0044723 A1 | 3/2004 | Bell et al. | |
| 2004/0044724 A1 | 3/2004 | Bell et al. | |
| 2004/0044785 A1 | 3/2004 | Bell et al. | |
| 2004/0066414 A1 | 4/2004 | Czerwinski et al. | |

OTHER PUBLICATIONS

"U.S. Appl. No. 10/228,822 Response filed Aug. 22, 2007 to Final Office Action mailed May 22, 2007", 14 pgs.

"U.S. Appl. No. 10/228,822, Advisory Action mailed Sep. 17, 2007", 3 pgs.

"U.S. Appl. No. 10/228,822, Final Office Action mailed Feb. 15, 2006", 10 pgs.

"U.S. Appl. No. 10/228,822, Final Office Action mailed May 22, 2007", 14 pgs.

"U.S. Appl. No. 10/228,822, Non-Final Office Action mailed Jan. 19, 2007", 26 pgs.

"U.S. Appl. No. 10/228,822, Non-Final Office Action mailed Oct. 19, 2005", 12 pgs.

"U.S. Appl. No. 10/228,822, Non-Final Office Action mailed Jun. 2, 2006", 13 pgs.

"U.S. Appl. No. 10/228,822, Notice of Allowance mailed Jan. 14, 2008", 8 pgs.

"U.S. Appl. No. 10/228,822, Notice of allowance mailed Jan. 14, 2008", 4 pgs.

"U.S. Appl. No. 10/228,822, Response filed Oct. 30, 2007 to advisory action mailed Sep. 17, 2007", 17 pgs.

"U.S. Appl. No. 10/228,822, Response filed Nov. 2, 2006 to Non-Final Office Action mailed Jun. 2, 2006", 12 pgs.

"U.S. Appl. No. 10/228,822, Response filed Dec. 19, 2005 to Non-Final Office Action mailed Oct. 19, 2005", 13 pgs.

"U.S. Appl. No. 10/228,822, Response filed Mar. 19, 2007 to Non-Final Office Action mailed Jan. 19, 2007", 12 pgs.

"U.S. Appl. No. 10/228,822, Response filed Apr. 17, 2006 to Final Office Action mailed Feb. 15, 2006", 11 pgs.

"U.S. Appl. No. 10/228,822, Response filed Aug. 22, 2007 to Final Office Action mailed May 22, 2007", 14 pgs.

"U.S. Appl. No. 10/228,827, Advisory Action mailed Jan. 31, 2007", 3 pgs.

"U.S. Appl. No. 10/228,827, Advisory Action mailed Oct. 3, 2005", 3 pgs.

"U.S. Appl. No. 10/228,827, Final Office Action mailed Oct. 11, 2006", 24 pgs.

"U.S. Appl. No. 10/228,827, Final Office Action mailed Dec. 20, 2005", 21 pgs.

"U.S. Appl. No. 10/228,827, Final Office Action mailed Jun. 14, 2005", 26 pgs.

"U.S. Appl. No. 10/228,827, Non-Final Office Action mailed Jan. 27, 2005", 20 pgs.

"U.S. Appl. No. 10/228,827, Non-Final Office Action mailed Mar. 23, 2006", 22 pgs.

"U.S. Appl. No. 10/228,827, Response filed Jan. 11, 2007 Final Office Action mailed Oct. 11, 2006", 7 pgs.

"U.S. Appl. No. 10/228,827, Response filed Jan. 31, 2006 Final Office Action mailed Dec. 20, 2005", 19 pgs.

"U.S. Appl. No. 10/228,827, Response filed Mar. 28, 2005 Non-Final Office Action mailed Jan. 27, 2005", 20 pgs.

"U.S. Appl. No. 10/228,827, Response filed Jul. 24, 2006 Non-Final Office Action mailed Mar. 23, 2006", 18 pgs.

"U.S. Appl. No. 10/228,827, Response filed Sep. 14, 2005 Final Office Action mailed Jun. 14, 2005", 17 pgs.

"U.S. Appl. No. 10/228,829, Final office action mailed Apr. 24, 2007", 12 pgs.

"U.S. Appl. No. 10/228,829, Non-Final Office Action mailed Nov. 4, 2005", 16 pgs.

"U.S. Appl. No. 10/228,829, Non-Final Office Action mailed Jul. 18, 2006", 25 pgs.

"U.S. Appl. No. 10/228,829, Non-Final Office Action mailed Aug. 3, 2006", 25 pgs.

"U.S. Appl. No. 10/228,829, Response filed Aug. 24, 2007 to Final Office Action mailed Apr. 24, 2007", 10 pgs.

"U.S. Appl. No. 10/228,829, Response filed Nov. 6, 2006 Non-Final Office Action mailed Aug. 3, 2006", 14 pgs.

"U.S. Appl. No. 10/228,829, Response filed Feb. 12, 2007 to restriction requirement mailed Jan. 17, 2007", 7 pgs.

"U.S. Appl. No. 10/228,829, Response filed Apr. 4, 2006 Non-Final Office Action mailed Nov. 4, 2005", 22 pgs.

"U.S. Appl. No. 10/228,829, Response filed Aug. 24, 2007 Final Office Action mailed Apr. 24, 2007", 10 pgs.

"U.S. Appl. No. 10/228,829, Restriction Requirement mailed Jan. 17, 2007", 5 pgs.

"U.S. Appl. No. 10/229,373, Final Office Action mailed Jun. 20, 2006", 11 pgs.

"U.S. Appl. No. 10/229,373, Non-Final Office Action mailed Oct. 19, 2005", 28 pgs.

"U.S. Appl. No. 10/229,373, Non-Final Office Action mailed Feb. 8, 2007", 11 pgs.

"U.S. Appl. No. 10/229,373, Notice of allowance mailed Oct. 25, 2007", 11.

"U.S. Appl. No. 10/229,373, Response filed Aug. 8, 2007 in response to Non-Final Office Action mailed Feb. 8, 2007", 12 pgs.

"U.S. Appl. No. 10/229,373, Response filed Nov. 20, 2006 to final office action mailed Jun. 20, 2006", 8 pgs.

"U.S. Appl. No. 10/229,373, Response filed Nov. 29, 2007 to notice of allowance mailed Oct. 25, 2007", 8 pgs.

"U.S. Appl. No. 10/229,373, Response filed Apr. 19, 2006 Non-Final Office Action mailed Oct. 19, 2005", 11 pgs.

"U.S. Appl. No. 10/229,373, Response filed Jun. 20, 2006 Final Office Action mailed Nov. 21, 2006", 8 pgs.

"U.S. Appl. No. 10/229,373, Response filed Aug. 8, 2007 to Non-Final Office Action mailed Feb. 8, 2007", 12 pgs.

"U.S. Appl. No. 12/061,991, Non Final Office Action mailed Jan. 13, 2010", 6 pgs.

"U.S. Appl. No. 12/061,991, Response filed Apr. 13, 2010 to Non Final Office Action mailed Jan. 13, 2010", 8 pgs.

"U.S. Appl. No. 12/061,991, Response filed Dec. 17, 2009 to Restriction Requirement mailed Dec. 15, 2009", 3 pgs.

"U.S. Appl. No. 12/061,991, Restracation Requirement mailed Dec. 15, 2009", 6 pgs.

"U.S. Appl. No. 12/061,991, Notice of Allowance mailed Jun. 14, 2010", 4.

"Digi-Frame Introduces High-End Large-Format Digital Picture Frames", Digi-Frame/Press Release, www.digi-frame.com/press6.html, (Jan. 5, 2001), 2 pgs.

"Frequently Asked Questions: Registered, Network-Connected Kodak Smart Picture Frame", www.kodak.com/cluster/global/en/service/faqs/faq1622.shtml, (Jun. 19, 2002), 19 pgs.

"Structured Metadata for Application Specific Viewers for Streamed Internet Video/Audio", IBM Technical Disclosure Bulletin, 40 (10), (Oct. 1, 1997), 123-128.

Adler, R. M, "Emerging Standards for Component Software", Computer, 28(3), IEEE, (1995), 68-77.

Berry, R. E, et al., "The Evolution of the Common User Access Workplace Model", IBM Systems Journal, 31(3), (1992), 414-428.

Cadiz, J. J, et al., "Designing and deploying an information awareness interface.", Proceedings of the 2002 AMC Conf. on Computer suported cooperative work., (2002), 314-323.

Gates, Bill, et al., "Plugged in At Home", In: The Road Ahead, Published in 1995 by Viking Penguin, (1995), 216-226.

Gillet, S., et al., "A Taxonomy of Internet Appliances", http://ebusiness.mit.edu, Center for eBusiness@MIT, (Sep. 2000), 1-28.

Greenberg, S., et al., "The notification collage: posting information to public and personal displays", Conference on Human Factors in Computing Systems, ISBN 1-58113-327-8, (Mar. 31-Apr. 5, 2001), 514-521.

Kent, P., "", The Complete Idiot's Guide to the Internet, Seventh Edition, Penguin Group (USA) Inc., (2001), 263-277.

Kim, James L., "Digi-Frame DF-560", www.techtv.com/freshgear/print/0,23102,2582371,00.html, (Nov. 28, 2001), 2 pgs.

Kim, James L., "Idea Grove's Ceiva Internet Picture Frame", www.techtv.com/freshgear/print/0,23102,2426604,00.html, (Feb. 11, 2000), 2 pgs.

Kim, James L., "Kodak StoryBox Smart Picture Frame", www.techtv.com/freshgear/print/023102,6740,00.html, (Aug. 22, 2000), 4 pgs.

Kim, James L., "Sony CyberFrame PHD-A55", www.techtv.com/freshgear/firstlook/story/0,23008,2334151,00.html, (Oct. 1, 1999), 2 pgs.

McFedries, P., "", The Complete Idiot's Guide to Windows 95, Second Edition, Que (r) Corporation, (1997), 125-129.

Miller, M., "", Sams Teach Yourself More Windows 98 in 24 Hours, (1998).

North, C., et al., "User Controlled Overviews of an Image Library: A case study of the Visible Human", on Digital Libraries Proceedings, ISBN 0-89791-830-4, (1996), 74-82.

Ohnishi, A., et al., "Visual Software Requirement Definition Environment", IEEE, Computer Software and Applications Conference, COMPSAC '97 Proceedings, (Aug. 1997), 624-629.

O'Reilly, T., et al., "", Windows 95 in a Nutshell: A desktop Quick Reference, (1998).

Rodenstein, R., et al., "Talking in Circles: Designing a Spatially-Grounded Audioconferencing Environment", CHI Letters, 2(1), (Apr. 2000), 81-88.

Rohrer, T., "Metaphors we compute by: bringing magic into interface design", http://philosophy.uoregon.edu/metaphor/gui4web.htm, (1995), 1-7.

Terry, M., et al., "Side Views: persistent, on demand previews for open-ended tasks.", Proceeding of he 15th annual ACM symposium on User interface software and technology, ACM Press New York, NY,USA, (2002), 71-80.

Ullmer, B., et al., "MediaBlocks: Physical Containers, Transports, and Controls for Online Media", Computer Graphics Proceedings (SIGGRAPH 98), (1998), 1-8.

Woodruff, A., et al., "Using Thumbnails to Search the Web", Conference on Human Factors in Computing Systems, ISBN: 1-58113-327-8, (Mar. 31-Apr. 5, 2001), 198-205.

* cited by examiner

USER INTERFACE TO FACILITATE EXCHANGING FILES AMONG PROCESSOR-BASED DEVICES

The present application is a divisional of U.S. patent application Ser. No. 12/061,991, filed Apr. 3, 2008, now issued as U.S. Pat. No. 7,814,148, which is a continuation of U.S. patent application Ser No. 10/228,822, filed on Aug. 27, 2002, now issued as U.S. Pat. No. 7,376,696, all of which are incorporated herein by reference in their entireties.

RELATED APPLICATIONS

The present application is related to the following applications that were assigned to the same assignee as the parent application and were filed on even date therewith:

(1) Ser. No. 10/228,829, entitled "Apparatus and Methods to Exchange Menu Information Among Processor-Based Devices", now abandoned.

(2) Ser. No. 10/229,373, entitled "Network of Disparate Processor-Based Devices to Exchange and Display Media Files", now issued as U.S. Pat. No. 7,426,432; and (3) Ser. No. 10/228,827, entitled "Apparatus and Methods to Select and Access Displayed Objects", now abandoned.

TECHNICAL FIELD

Embodiments of the present invention relate generally to the transfer and routing of digital media and, more particularly, to a user interface to facilitate exchanging media files among processor-based devices, and to methods related thereto.

BACKGROUND INFORMATION

Computing devices, such as personal computers (PCs), are widespread within the fabric of current communications networks at every level, from in-home networks to global networks like the Internet and the World-Wide Web ("WWW"). Digital media files of many types, including pictures, video, audio, greeting cards, animations, games, artwork, music compositions, x-rays, scanned documents, software programs, and the like are frequently transmitted between computing devices.

In a variety of known examples, one processor-based device functioning as a host may communicate wirelessly or via a cable with a less fully featured processor-based device that may be referred to herein as a "processor-based appliance", a "digital appliance", an "electronic appliance", or simply an "appliance". An example is a chat pad wirelessly communicating with a PC. Another example is a processor-based telephone communicating telephone call information with a processor-based device that acts as a host. Other examples include a personal digital assistant (PDA) or a digital music player that may wirelessly communicate with a PC.

However, to handle, file, and transfer digital media files, a substantial amount of user involvement may be required. Often, a computer user will find operations involving a digital media file so frustrating that he or she will quit trying to use a particular digital media file or even forego using all digital media files. This is particularly true for operations involving transferring or forwarding a digital media file to another processor-based device, such as emailing a digital photo to a friend, transmitting a digital photo to a digital picture frame (DPF) (discussed in greater detail in the "Detailed Description"), downloading an audio file to a personal entertainment device like an MP3 (Moving Picture Experts Group, audio layer 3) audio player, and the like.

For example, a computer user may receive a video postcard attached to an e-mail and want to display it on his digital picture frame in another room, or he may want to download an MP3 file to his MP3 audio player. He typically must open additional applications and follow an involved and often non-intuitive series of steps to move the digital media file to the proper file folder, where the appropriate media manager software can find it and include it in subsequent downloads. It is time-consuming, inconvenient, and frustrating to operate in the current manner. Less PC-literate consumers often experience difficulty in finding files they download from email and are not able to find and forward such files to people operating other processor-based devices.

For example, to share a digital media file with a buddy via electronic mail, the user must open an electronic mail application, create a new electronic mail message, address the electronic mail message, remember the location of the file to attach and its potentially obscure file system name, attach the desired media file, think of something to say to the recipient, and send the message. Thus, simply handling and transferring files exceeds the level of sophistication of many likely system users.

In general, many media transfer operations on processor-based devices are time-consuming and inconvenient. These operations may be sufficiently tedious that they may significantly decrease the user's enjoyment and utilization of the processor-based device.

There is a wide variation in resources among processor-based devices, ranging from full-featured computing systems to very basic processor-based devices.

Examples of processor-based devices having relatively limited features include a variety of digital appliances. Such appliances typically have reduced processing and storage resources compared with typical PCs. A few examples of such processor-based devices include a digital picture frame, a digital music player, a PDA, Internet-capable cellular telephones, and the like.

A digital picture frame (also referred to herein as a "DPF") is a processor-based device that includes a display for displaying digital pictures. A DPF may be used like a conventional picture frame to display pictures, such as pictures of family and friends and the like. However, with a DPF, the pictures may be changed and displayed digitally.

A number of DPFs are known in the art, including DPFs that are commercially available from Sony Corporation of America, New York City, N.Y.; Digi-Frame Inc., Port Chester, N.Y.; Ceiva Logic, Inc., Burbank, Calif.; and Eastman Kodak Company, Rochester, N.Y. DPFs may also be referred to in the art as electronic picture frames, Internet frames, or smart frames.

In known DPFs, two basic types of image file handling are used. In one type, pictures can be input from a digital camera or PC, and the pictures are conveyed into and out of the DPF on a removable memory element or device, such as a memory card, MemoryStick™ device, SmartMedia™ device, or the like.

In the second type, the DPF can periodically download pictures over a modem from the Internet into a local memory for display. In addition, some DPFs are also capable of uploading pictures via the Internet to a dedicated server. When an Internet appliance connection service is provided today, the user must pay a monthly subscription fee.

In the field of DPFs, there is significant competitive pressure among manufacturers to increase the performance of their equipment. As market forces drive DPF manufacturers to produce DPFs with increased performance, DPF architectures and feature sets accordingly need to support the increased performance expectations.

Thus, there is a need for better ways to transfer media information between processor-based devices including, but not limited to, appliances such as a DPF.

DETAILED DESCRIPTION

In the following detailed description of embodiments of the invention, reference is made to the accompanying drawings that form a part hereof, and in which is shown by way of illustration, but not of limitation, specific embodiments of the invention. These embodiments are described in sufficient detail to enable those skilled in the art to understand and implement them, and it is to be understood that other embodiments may be utilized and that mechanical, chemical, structural, electrical, and procedural changes may be made without departing from the spirit and scope of the present disclosure. The following detailed description is, therefore, not to be taken in a limiting sense, and the scope of embodiments of the present invention is defined only by the appended claims.

In embodiments of the present invention, processor-based devices such as DPFs may input and output media content files through a connection to a host such as a PC. A host may facilitate exchange of digital media content files across the host's Internet connection on behalf of the appliance, so that the appliance user need not pay for an additional fee for a separate appliance Internet service.

Further, an appliance user's experience in sharing digital media content files is improved, by automating the repetitive and sometimes confusing tasks associated with file preparation, uploading, downloading, and finding new files for viewing.

Figure 1:
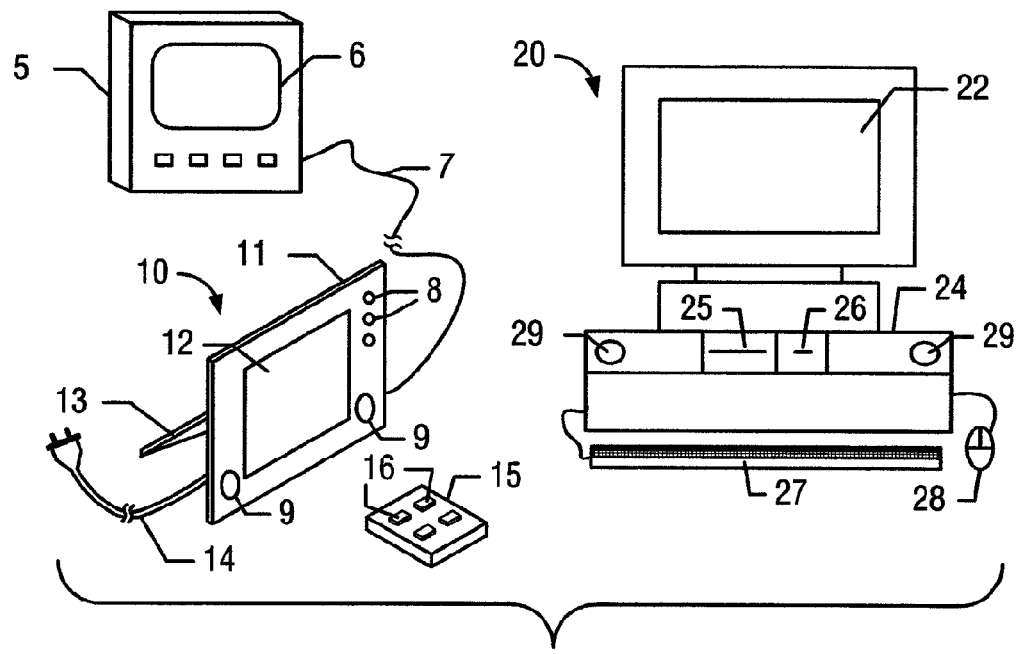
FIG. 1 is a perspective view of equipment, including a processor-based appliance such as a digital picture frame, and a host computer, to implement one or more embodiments of the present invention.

FIG. 1 is a perspective view of equipment, including a processor-based device such as a digital picture frame 10, and a host computer 20, to implement one or more embodiments of the present invention. Processor-based appliance 10 and host computer 20 and are both examples of processor-based devices.

The computing equipment shown in FIG. 1 is merely one example in which embodiments of the present invention can be used. In one example, a digital media file can be routed from a host computer 20 to a DPF 10 or other processor-based device. Elsewhere in the "Detailed Description" is described how a digital media file can be routed from a host computer to another host computer.

Host computer (also referred to herein simply as "host") 20 may be or include a personal computer 24. Host 20 may include a screen or display 22 in accordance with one embodiment. Host 20 may include one or more removable media slots, such as floppy disk slot 25 and memory card slot 26. Host 20 may also include a keyboard 27, a pointing device such as mouse 28, and/or any other element that permits an appliance user to input information into and receive information from host 20. Host 20 may include one or more loudspeakers 29.

Processor-based appliance 10 comprises a housing 11 and an optional screen or display 12. Display 12 displays any type of visually perceivable images, including text, graphics, and still or moving pictures. Processor-based appliance 10, in one embodiment, can optionally be coupled via a wire or cable 7 to an auxiliary display 5 having a screen or display 6, and having other user interface elements, such as controls, loudspeakers, and so forth. Auxiliary display 5 could be a television, computer monitor, or any other equipment that is suitable to render visual and/or audio media. In one embodiment, auxiliary display 5 is used with a low-cost processor-based appliance 10 that has no display 12. In another embodiment, auxiliary display 5 can provide features not provided on the processor-based appliance 10. For example, auxiliary display 5 can be a large-screen TV or high-definition TV.

Processor-based appliance 10 comprises suitable human interface elements with which an appliance user can input information into processor-based appliance 10 and receive information from processor-based appliance 10.

"Suitable", as used herein, means having characteristics that are sufficient to produce the desired result(s). Suitability for the intended purpose can be determined by one of ordinary skill in the art using only routine experimentation.

Thus, processor-based appliance 10 can comprise one or more controls 8. Alternatively, on-screen touch-sensitive buttons (not shown) could be used. In one embodiment, appliance 10 is controlled by a wireless remote control 15 having one or more control buttons 16. Appliance 10 can include one or more loudspeakers 9.

Processor-based appliance 10, in one embodiment, is optionally supported in an upright configuration by a stand 13. Processor-based appliance 10 may be coupled to a suitable wall power outlet by a power cord 14; alternatively, processor-based appliance 10 could be operated using battery-supplied power.

Processor-based appliance 10, in the embodiment shown in FIG. 1, communicates wirelessly and bi-directionally with host 20; however, in other embodiments, processor-based appliance 10 could be coupled via wire or cable to host 20.

In one embodiment, host 20 communicates with processor-based appliance 10 using radio frequency signals, for example, in accordance with the Bluetooth specification (Specification of the Bluetooth System, Version 1.1, Feb. 22, 2001), the 802.11 specification (IEEE Standard 802.11 available from the Institute of Electrical and Electronics Engineers, New York, N.Y.), a Wireless Fidelity ("Wi-Fi") protocol, or the like. Similarly, the remote control 15 may use any available wireless protocol to communicate with processor-based appliance 10. The communication may be made via a suitable infrared protocol. Typically, processor-based appliance 10 communicates with host 20 via a high bandwidth communications link, whereas processor-based appliance 10 communicates with remote control 15 using a low bandwidth link.

By using wireless communications between host 20 and processor-based appliance 10, a user of processor-based appliance 10 can conveniently roam within a reasonable distance of host 20, e.g. within the user's home.

In one embodiment, host 20 and processor-based appliance 10 are each assigned a unique 48-bit identifier (ID) to uniquely identify them. Host 20 and processor-based appliance 10 can communicate with each other by transmitting packets, using a suitable protocol. Alternatively, they could communicate in any other suitable manner.

Other types of computing devices could be substituted for host 20. Such devices may take the form of a laptop or hand-held computer, for example. The substantive difference between host 20 and processor-based appliance 10 is primarily one of relative computational resources, as will be explained in greater detail regarding FIG. 17 below. In general, host 20 tends to have greater memory and/or processing resources than processor-based appliance 10.

Other types of processor-based devices or appliances 10 could be substituted for the DPF illustrated in FIG. 1. Without limitation, such alternative processor-based appliances 10 could include any device that can play back visual and/or audio information. For example, such a device may take the form of an Internet appliance, a hand-held computer, a laptop computer, a wireless communications device (e.g., cellular phone, 2-way pager, etc.), a personal entertainment device (e.g. a radio), audio-visual equipment, a personal digital assistant, an electronic book, and the like.

In accordance with one embodiment of the present invention, the host 20 may store a large number of digital pictures. These pictures may be transmitted under certain conditions to the processor-based appliance 10 for display on the display 12. In some embodiments, the display 12 displays, for variable periods of time, various pictures creating a digital slide-show on the DPF. In some cases, the pictures that are displayed on the display 12 are automatically varied with time of day and day of year or other change criteria. Thus, the picture display 12 of the processor-based appliance 10 may be periodically varied and updated to display a variety of images.

In accordance with one embodiment of the present invention, a gallery of digital pictures is provided at periodic intervals to the processor-based appliance 10. In one embodiment, a predetermined number (e.g., 40) of digital pictures may be provided each day over a wireless link to the processor-based appliance 10. The processor-based appliance 10 may then store those pictures in its memory (e.g. memory 31, FIG. 2) and may make those pictures available for display on the display 12, or the processor-based appliance 10 may automatically successively display those pictures in a slide show. In the next periodic interval, the pictures that are stored on the processor-based appliance memory may be overwritten or, if the memory capacity is sufficient, new pictures may be stored in addition to the previous interval's pictures.

However, rather than store the entire library of available pictures on the processor-based appliance 10, it may be advantageous in some embodiments to maintain the bulk of the available picture gallery on the host 20. This enables the processor-based appliance 10 to carry less storage capacity, decreasing costs in some embodiments. In addition, the need to wirelessly communicate a large amount of data between the host 20 and the processor-based appliance 10 may be reduced.

Figure 2:
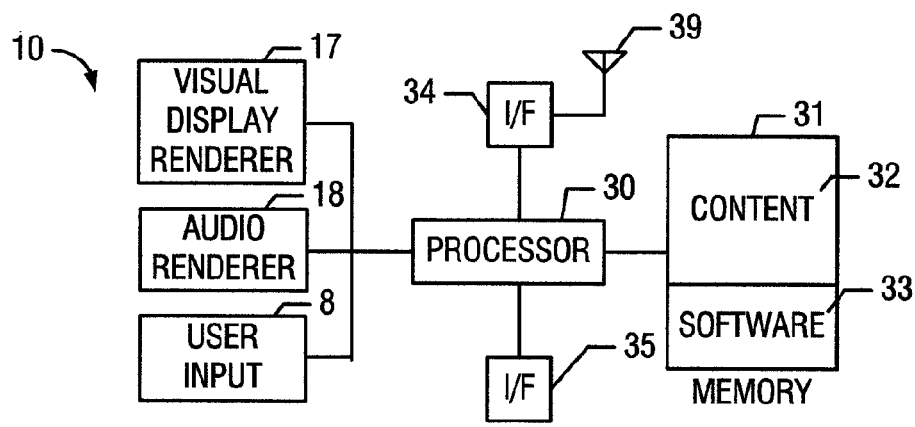
FIG. 2 is a block diagram of a processor-based appliance in accordance with an embodiment of the present invention.

FIG. 2 is a block diagram of a processor-based appliance 10 in accordance with an embodiment of the present invention. The block diagram of FIG. 2 represents just one exemplary embodiment of a processor-based appliance 10. In this example, processor-based appliance 10 comprises a DPF. Processor-based appliance 10 comprises a suitable processor 30.

As used herein, "processor" means any type of computational circuit such as, but not limited to, a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), or any other type of processor or processing circuit. The term also includes embedded controllers, such as Generic or Programmable Logic Devices or Arrays, Application Specific Integrated Circuits, single-chip computers, and the like.

A visual display renderer 17, which can include all suitable circuitry for converting digital information into human-perceivable visual form, is coupled to processor 30. An optional sound reproduction element or audio renderer 18, which can include all suitable circuitry for converting digital information into human-perceivable audio form, is also coupled to processor 30. A suitable user input element 8, such as one or more control knobs, on-screen touch-sensitive buttons, or the like is also coupled to processor 30.

A first interface (I/F) 34, having an antenna 39, is coupled to processor 30. I/F 34 is used to interface processor-based appliance 10 wirelessly with a suitable wireless interface (not shown) of host 20.

A second interface (I/F) 35 is coupled to processor 30. I/F 35 is used to interface processor-based appliance 10 wirelessly to remote control 15 (refer to FIG. 1 or 3).

Still referring to FIG. 2, a memory 31 is coupled to processor 30. Memory 31 can be any suitable memory device(s) like read only memory (ROM); random access memory (RAM); hard drive; removable media drive for handling compact disks (CDs), digital video disks (DVDs), diskettes, magnetic tape cartridges, memory cards, MemoryStick™ devices, SmartMedia™ devices, and other types of data storage; or the like.

Memory 31 can comprise digital content 32 and software 33. Content 32 can include images (both still and moving), text, audio, and any other types of digital content.

Software 33 can include one or more suitable software programs. For example, software 33 can include suitable operating system (O/S) software, one or more software applications, and any other types of software as required to perform the operational requirements of processor-based appliance 10.

Figure 3:
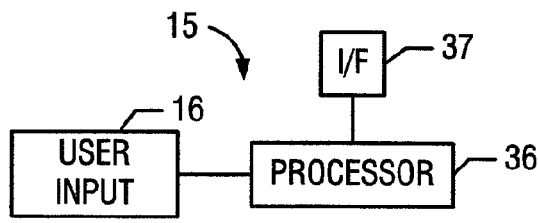
FIG. 3 is a block diagram of a wireless remote control shown in FIG. 1, in accordance with an embodiment of the present invention.

FIG. 3 is a block diagram of a wireless remote control 15 shown in FIG. 1, in accordance with an embodiment of the present invention. The remote control 15 may comprise a processor 36 to control its operation.

Remote control 15 further comprises an interface (I/F) 37 that is coupled to processor 36. I/F 37 communicates with I/F 35 of processor-based appliance 10 (refer to FIG. 2).

Still referring to FIG. 3, remote control 15 further comprises a suitable user input 16, e.g. in the form of one or more control buttons (refer to FIG. 1).

Figure 4:
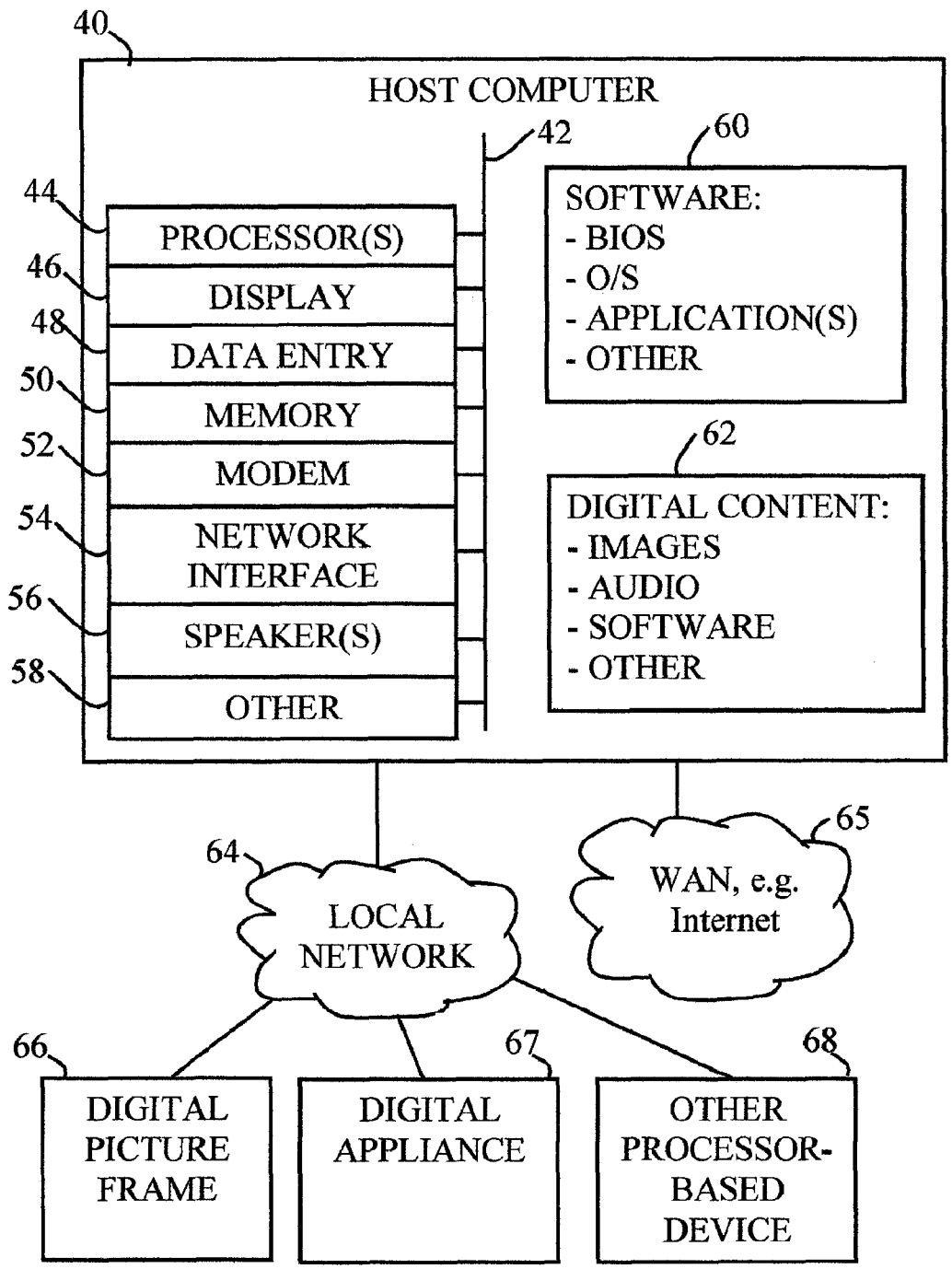
FIG. 4 is a block diagram of a host computer that is coupled to a local network and/or a wide-area network, and that implements one or more embodiments of the present invention.

FIG. 4 is a block diagram of a host computer 40 that is coupled to a local network 64 and/or a wide-area network 65, and that implements one or more embodiments of the present invention. Host 40 can be similar to or identical to host 20 illustrated in FIG. 1.

FIG. 4 and the following discussion provide a brief, general description of a suitable computing environment in which certain embodiments of the present invention may be implemented.

Thus, an exemplary host 40 comprises a computing device, a computing machine, a data processing system, or the like. Host 40 is merely one example of a computing system with which embodiments of the present invention can be used.

Host 40 comprises a system bus 42 to couple the various components of the system. System bus 42 provides communications links among the various components of host 40 and can be implemented as a single bus, as a combination of busses, or in any other suitable manner.

Coupled to bus 42 are typically one or more processors 44, a screen or display 46, and one or more data entry or selection elements 48 such as a keyboard, mouse, trackball, joy stick, touch-sensitive screen, or the like.

Also coupled to bus 42 is a memory 50, which can include any suitable memory device(s) like read only memory (ROM); random access memory (RAM); hard drive; removable media drive for handling compact disks (CDs), digital video disks (DVDs), diskettes, magnetic tape cartridges, memory cards, MemoryStick™ devices, SmartMedia™ devices, and other types of data storage; or the like.

Additional elements may also be coupled to bus 42 such as a modem 52, a network interface unit 54, one or more loudspeakers 56, and other suitable devices 58.

Host 40 can also include a plurality of types of software programs. For example, host 40 can comprise software 60 that includes a basic input/output system (BIOS), operating system (O/S) software, one or more software applications, and any other types of software as required to perform the operational requirements of host 40.

Host 40 can also include a plurality of types of digital content 62. For example, host 40 can comprise digital content 62 that includes images (both still and moving), text, audio, computer software, and any other types of digital content.

Host 40 can operate in a networked environment using physical and/or logical connections to local network 64 and/or wide area network (WAN) 65. The connections to these networks can be wired and/or wireless.

Local network 64 can comprise any number or type of computing devices, such as a DPF 66, digital appliance 67, or any other processor-based device 68 such as those mentioned elsewhere herein.

WAN 65 can be any type of network that is greater in scope than local network 64. In one embodiment, WAN 65 comprises a global communications network, such as the Internet. In another embodiment, WAN 65 could comprise an intranet.

Embodiments of the invention may be implemented in conjunction with program modules, including functions, procedures, data structures, application programs, etc. for performing tasks, or defining abstract data types or low-level hardware contexts. Program modules may be stored in memory 50 and associated storage media, e.g., hard drives, floppy disks, optical storage, magnetic cassettes, tapes, flash memory cards, MemoryStick™ devices, SmartMedia™ devices, digital video disks, chemical storage, and/or biological storage. Program modules may be delivered over transmission environments, including networks 64 and 65, in the form of packets, serial data, parallel data, propagated signals, or any other suitable form. Program modules may be used in a compressed or encrypted format, and they may be used in a distributed environment and stored in local and/or remote memory, for access by single and multi-processor machines, or any other type of host 40.

Figure 5:
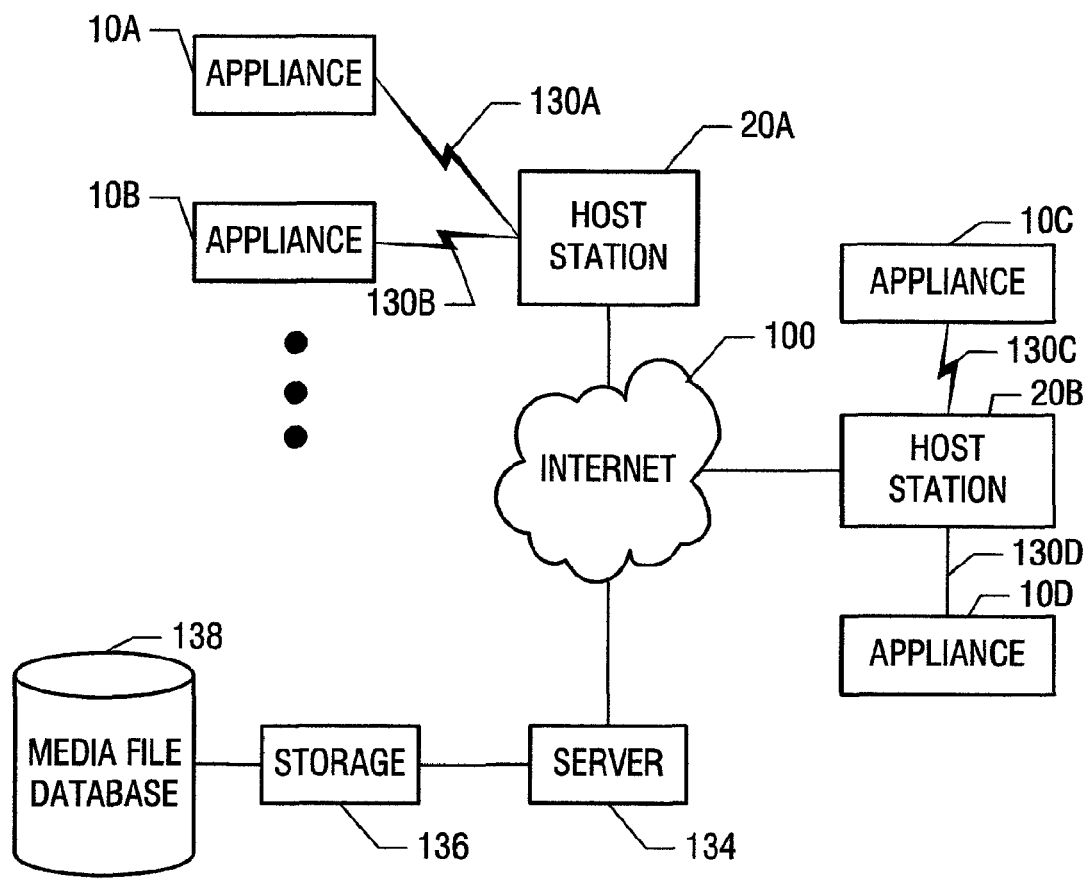
FIG. 5 is a block diagram of a network comprising a server, a plurality of hosts, and a plurality of processor-based devices, DPFs, or other appliances, in accordance with one embodiment of the present invention.

FIG. 5 is a block diagram of a network 100 comprising a server 134, a plurality of hosts 20A-20B, and a plurality of processor-based devices, DPFs or other appliances 10A-10D, in accordance with one embodiment of the present invention. Network 100 can be the Internet or another network of any type.

Coupled to network 100 are a first host 20A and a second host 20B, each of which can be like host 40 illustrated in FIG. 4. Host 20A has several appliances 10A-10B coupled to it via wireless communications links 130A-130B, respectively. Host 20B has appliances 10C-10D coupled to it via a wireless link 130C and a wired link 130D, respectively. While wireless links are shown for some appliances, and wired links are shown for others, the type of communications link is not at all critical, and any suitable type of link may be utilized. Appliances may be continually connected to their host or sporadically connected. Methods for managing sporadically connected appliances are described in Related Application (2).

Also coupled to network 100 is a server 134 that includes a storage element 136, which has an internal media file database 138 serving as a repository of digital media files. Hosts 20A-20B and appliances 10A-10D can likewise store digital media files. In one embodiment, server 134 enables image sharing among users of hosts 20A-20B and of appliances 10A-10D. The server 134 manages routing among the various elements of network 100, including hosts 20A-20B and appliances 10A-10D.

The term "buddy", as used herein, refers to a person on a list of correspondents that may be maintained on the user's processor-based device or host, for example. A "buddy list" is known in the art as a colloquial term for a computer-based address book that manages names and network (e.g. Internet) addresses. Network addresses can include e-mail accounts, Instant Messaging accounts, and so forth.

It is useful to have buddy lists on appliances as well, to facilitate the exchange of digital media content files. In some cases, an appliance buddy list may simply be a user-selected subset of a more complete buddy list on a host. In other instances, a buddy list may be automatically populated with buddies with whom messages have been exchanged in the past.

A buddy list for digital content media sharing may also include Internet account addresses for other users' digital appliances as well as their existing Internet accounts.

For example, in an embodiment where the appliances 10A-10D are digital picture frames, a user may download an image from a digital camera onto a host, such as host 20A. The user may wish to send the image to family members' appliances 10C-10D. To do so, the user may locate the images, typically visually, displayed within a file browser such as Windows Explorer or an imaging application. The user may select the images to send and may then initiate a background routing application to assist with of all of the intermediate steps. This will be explained later in greater detail regarding FIG. 6.

Also, as will be explained in greater detail regarding FIG. 7 below, once a sharing application has launched, the user may also select, for example from a pop-up buddy list, those buddies who are desired recipients of the selected images. The user may then operate a send button or other control element to indicate confirmation to launch the process. Application software described hereinafter automates the rest of the image transfer and delivery, causing the images to appear on the appliances 10A-10D (FIG. 5) of the designated recipients following their respective hosts' next Internet access.

Still referring to FIG. 5, an appliance user can alternatively share images currently being displayed on any appliance 10A-10D. From appliance 10A, for example, while viewing an image on appliance 10A, the user may decide to share the image with a recipient or buddy using appliance 10C, for example. Via the user interface of appliance 10A, the user can select the sharing operation. The user may then select the recipient from a list, and he may be asked to indicate confirmation (not shown) to complete the request. The appliance processor relays the request containing an identifier for the selected image, as well as an identifier for the recipient, to host 20A. Host 20A can connect with the Internet 100 using an established Internet service provider link. The image is earmarked for the designated recipient and is uploaded to server 134.

Application software on the recipient's host 20B causes host 20B to regularly check in with the server 134. The newly sent image is authenticated and downloaded to a directory on the host 20B for subsequent scheduled delivery to the recipient's appliance 10C.

To the recipient at appliance 10C, images from authorized friends and family simply appear on the appliance 10C without any effort in some embodiments. Thus, the amount of effort for users to share digital images may be reduced, enabling users to freely share images in an automated fashion using their existing Internet service provider. No phone lines need be dedicated to the appliances 10A-10D, and the appliances 10A-10D need not be constantly connected to a telephone line in some embodiments.

An application software program 60 residing on the host (FIG. 4) automates the host side of the sharing process, and it may include a number of sub-processes in some embodiments. A complementary software program residing on the server (134, FIG. 5) automates the server side of the sharing process, and it may also include a number of sub-processes in some embodiments.

These sub-processes may include a user registration sub-process. The user registration sub-process involves setting up an account on the server 134 (referring once again to FIG. 5) and establishing the user as a sharing system participant. This also causes the server 134 to reserve resources such as short-term image storage space for the user.

Another sub-process is target location. Target location involves determining whether the recipient is registered with the server or should be contacted through a conventional Internet account. Buddies who are registered with the server are further evaluated to determine whether they have registered an appliance 10A-10D. If the target recipients are located within the registered group, digital content shared with them will be automatically uploaded and downloaded. If the target recipients are not registered, the content shared with them will only be automatically uploaded to ease the sharing burden for the sender.

Matching lists of all of a user's buddies may be stored on a host 20A and/or 20B and in their appliances 10A-10D. A master list of all registered users is maintained by the server 134.

The access control sub-process involves controlling access permissions. The user defines the authorized buddies whose image deliveries he wishes to have automatically routed through to his appliance. Non-authorized deliveries are not permitted to be delivered automatically.

The target selection sub-process involves supporting the user selection of a media recipient.

The transmission sub-process implements the physical process of transmitting content to the server 134, which content is then routed to the assigned target(s), which may be recipients' appliances.

The receipt sub-process implements the physical act of downloading content intended for a user's appliance.

The user registration sub-process may begin, in one embodiment, with the installation of software 33 (FIG. 2) in an appliance 10A-10D (FIG. 5). The software 33 couples the user's appliance to a server in network 100. The first time a user's appliance connects with the server, a registration function may be performed, for example, by server 134 or by another server (not shown) in network 100. The registration function records information regarding the user's appliance to allow others to locate the user's appliance. The registration function also creates the information objects required to support the image content for each appliance owned by that user. The function also reserves resources such as short-term image storage space for the user's appliance and enables users to authorize sharing permissions.

Additionally, in some embodiments, each time another appliance is installed, the associated host 20A-20B (referring once again to FIG. 5) may connect to the registration server to update the host records and register the new appliance.

After the initial registration is complete, the installation process may continue in some embodiments with the setup of a sharing buddy list. The user may be asked to initialize the sharing buddy list with acquaintances the user intends to exchange media files with. This list of buddies is retained locally in the user's host, e.g. host 20A, and a copy of the buddy list is also sent to the associated appliance 10A-10B. In other embodiments, a copy of the buddy list could also be forwarded to appliances 10C-10D associated with another host 20B, and in doing so, ease the setup process for a group of associated users, such as a friends and family sharing circle.

For a user on appliance 10A, for example, his or her buddies' electronic mail addresses and, if available, their appliances, e.g. appliances 10B-10D, may be incorporated in the sharing buddy list. In one embodiment, once buddies are selected by a user's appliance (and by the user's host's notifying server 134), an electronic mail message generated by server 134 may invite buddies to register with the sharing service. If they register, they too can take advantage of the media file-sharing system. Buddies who choose not to register with the media sharing system may receive media files as attachments to automatically generated electronic mail messages. Buddies who do choose to register are provided the software to interface with the sharing Web server 134, and to perform periodic checks for new image files, and a folder is set up for saving newly received images.

At each initialization of application software (e.g. software 60, FIG. 4) of a host 20A or 20B, or at specific intervals, the host may connect to the Web server 134 (FIG. 5) to see whether any new media files are awaiting download. System maintenance tasks may also be performed during periodic host-server connections. Such maintenance tasks can include retrieval of host or appliance software updates, and a scan to see whether any of the unregistered buddies have registered with the sharing service. If so, the buddy list may be updated in a suitable manner to reflect this participation. Such information is maintained by the system, transparently to the user in some embodiments. This may be done so that the user does not have to be concerned about whether someone has actually registered or not.

Additionally, each user of an appliance 10A-10D may specify who is allowed to send file content directly to that user's appliance 10A-10D. As there are numerous nefarious Internet spammers, it may be desirable that access control be expressly granted. The user may select buddies from a buddy list to be granted trusted status, enabling those selected buddies to send content in a trusted manner. The permission lists may be synchronized with the server 134 in a host-server connection session.

To share a file with a buddy, for example, from an appliance 10A-10D, the user may simply select the "share" button on the remote control, while viewing the desired file. The appliance may then display the user's buddy list. Then the user may select a buddy and may indicate a confirmation to execute the sending. The share request is relayed to the host 20A or 20B with the selected file and recipient information, and the host 20A or 20B delivers the content to the server 134. At the server 134, the information is processed for distribution to the indicated recipient(s) according to any access rules on the recipient's account. If the recipient is not a registered user, then the server 134 simply generates a message, e.g. an email, attaches the file, and sends it to the recipient. Each registered recipient's permissions may accept or reject the file. If the file is accepted, it is put into the server's storage to await retrieval.

When the recipient's host software periodically connects with the server 134 to check for new content and detects that a file is waiting, the recipient's host software begins an automated download session. The file is placed in a temporary storage in host 20A or 20B and may be relayed to the recipient's appliance 10A, 10B, 10C, or 10D on its next synchronization or update cycle from the associated host 20A or 20B. The host update of an appliance is discussed below regarding FIG. 11.

File-sharing can also be initiated by the user from the host desktop, as will now be explained with reference to FIGS. 6-7.

Figure 6:
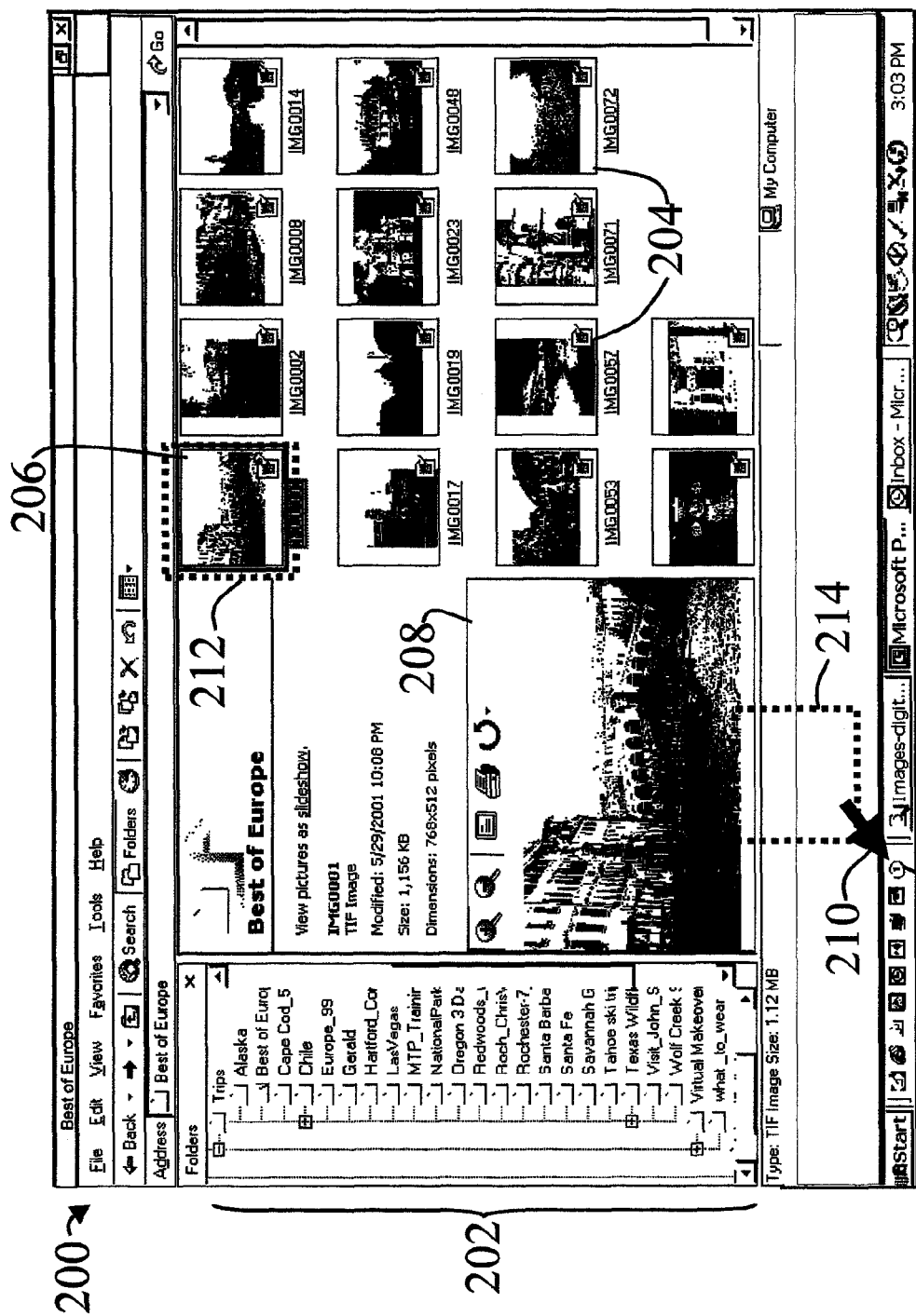
FIG. 6 is a depiction of a computer desktop showing a plurality of photo thumbnails and a pointer or cursor hovering over a desktop drop spot, in accordance with an embodiment of the present invention.

FIG. 6 is a depiction of a computer desktop 200 showing a plurality of photo thumbnails 204 and a pointer or cursor 210 hovering over a desktop drop spot 220, in accordance with an embodiment of the present invention. Computer desktop 200 is merely one example of a graphical user interface (GUI) that could be used to implement embodiments of the present invention. A "thumbnail image" is a miniature version of an image that can be used for quick browsing through a plurality of images.

Computer desktop 200 is a representation of how current PC operating systems, such as Microsoft Windows™ Millennium Edition™, Windows 2000™, Windows XP™, and the like, may display photo images or photo thumbnails 204 contained within a selected file folder containing a plurality of corresponding photo files. The aforementioned operating systems are available from Microsoft Inc. of Redmond, Wash. A list 202 of folders can appear at any suitable location on the desktop. In this illustration, the user has opened the folder entitled "Best of Europe" and chosen to view the photo files contained therein as photo thumbnails.

In known host GUI's, each photo thumbnail is displayed with an associated filename identifier (ID) in the form of an alpha-numeric ID located beneath the corresponding photo thumbnail 204. Some current digital cameras automatically assign a sequential file ID to each image file as it is captured, but finding the desired image using only the numerical filename in image sharing tasks has proven time-consuming for host users. The addition of a photo thumbnail 204 has been popular with users.

Images can be stored in a computer from many different sources, including downloading from a digital camera or memory element coupled to the computer, downloaded from an email, or transferred to the computer via another image transfer mechanism.

In the example illustrated in FIG. 6, the user has selected one specific photo image 206 for transfer to a desired target, which can be the user's own or a buddy's processor-based device, such as an appliance, another host, a Web photo server, or the like.

In one embodiment, the user simply selects photo image thumbnail 206 and drags it to a unique location or specific icon on the host desktop, referred to as a desktop "drop spot" 220. The drop spot 220 can be an icon located at any suitable place on the desktop, such as in the system tray at the bottom of the screen or among other application icons on the desktop. Alternatively, the drop spot 220 could be integrated with the file explorer window located close to the list 202 of folders, or the drop spot 220 could be located in the menu area at the top of the screen. The particular location of the drop spot 220 is not at all critical. In FIG. 6, as thumbnail 206 is dragged across the desktop 200 to the drop spot 220, a ghost image or border 214 may follow cursor 210. However, other alternative GUIs are also possible, including those discussed elsewhere herein.

More than one drop spot or shortcut icon can be used. For example, separate drop spots can be used for each different type of routing application to be invoked, such as one routing application to route media files to a DPF appliance, and another routing application to route media files to an MP3 player. In another embodiment, a separate drop spot could be used for each individual target. In a preferred embodiment, a consolidated drop spot could be used for multiple routing applications. The routing application can determine the appropriate sub-group of targets based on the selected file's extension type. For example, ".JPG" file-extension types would normally be associated with DPF appliances and image-sharing buddy lists, while ".PDF" file-extension types would typically be associated with electronic book appliances and sharing buddy lists.

When thumbnail 206 is selected, it may encircled by a border 212 to indicate that it has been selected or is receiving the user's focus. Many other embodiments are possible. For example, instead of the drag and drop operation to initiate auto media file-routing, the user could right-click with the mouse, select "Send To" from a pop-up menu, and then select his desired target from a subsequent pop-up menu. Another possibility is to make the selections and initiate the drop spot application by voice commands. Many other embodiments are possible for creating a desktop shortcut to enable a user to quickly and relatively effortlessly command the transfer of a desired media file to another processor-based device.

While the example of FIG. 6 illustrates how a photo file can be automatically routed, embodiments of the present invention are not to be construed as limited to photo files, and any other type of digital media file, such as those mentioned elsewhere herein, can be transferred. A visual representation of the digital media file, comparable to a photo image 206, is used. For example, for an audio file the visual representation could be a compact disc (CD) icon bearing the name of a recording artist.

Figure 7:
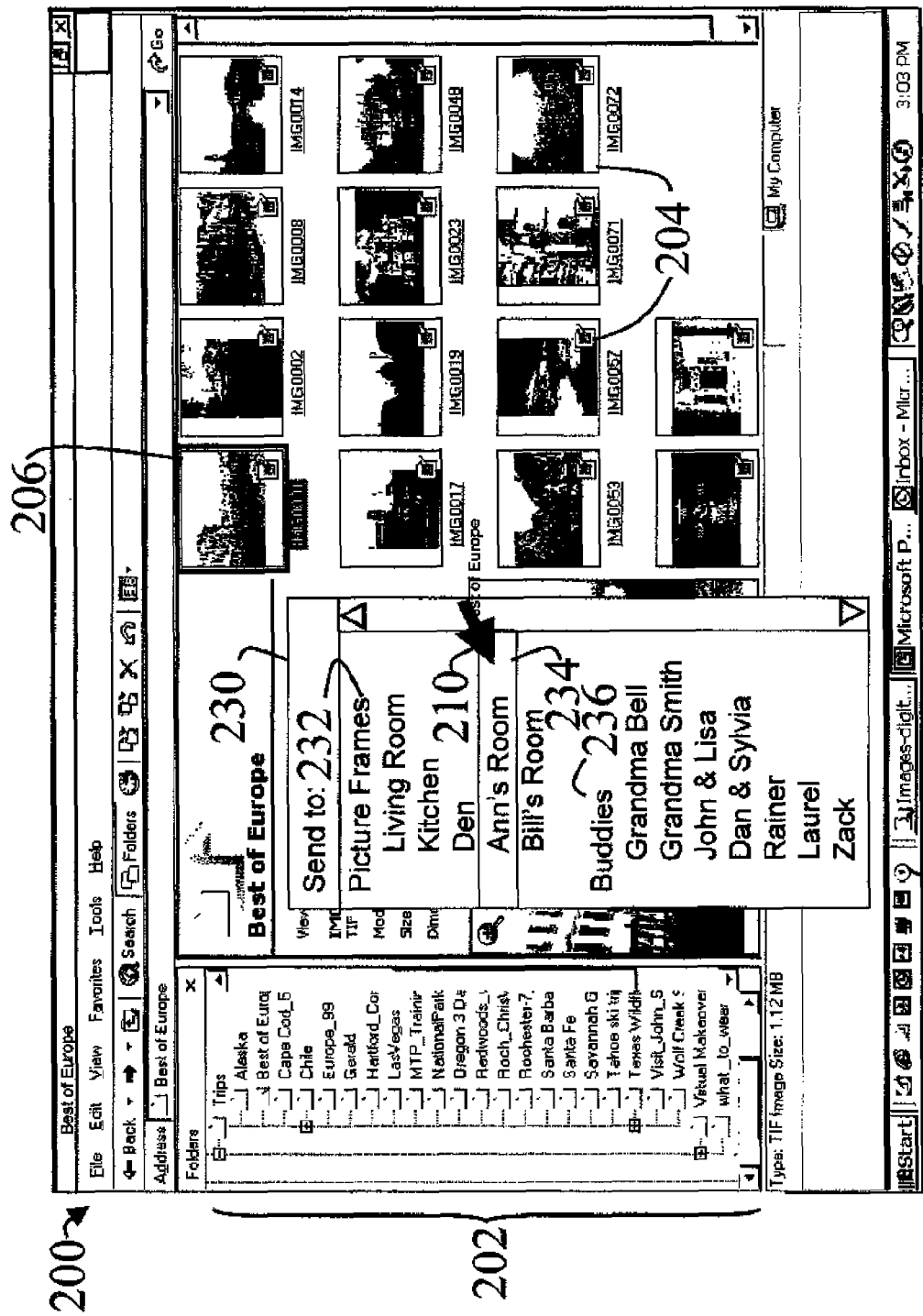
FIG. 7 is a depiction of a routing target menu of the computer desktop illustrated in FIG. 6 after a photo image has been dragged and dropped onto a desktop drop spot, in accordance with an embodiment of the present invention.

FIG. 7 is a depiction of a routing target menu 230 of the computer desktop 200 illustrated in FIG. 6 after a photo image 206 has been dragged and dropped onto a desktop drop spot 220, in accordance with an embodiment of the present invention. In response to the user's drag and drop action, a pop-up window with the target menu 230 can be displayed to the user, allowing the user to choose a desired target destination for the digital media file corresponding to the particular thumbnail 206.

As one example, the routing target menu 230 comprises a digital picture frame list 232 and a buddy list 236. The digital picture frame list 232 is a list of digital picture frames that are coupled, either wired or wirelessly, to the user's host. The buddy list 236 is a list of recipient targets, and each recipient target can be associated with an Internet account and/or a registered appliance. The target list is maintained by the user on the user's host and/or appliance(s).

In FIG. 7, the user has moved the cursor 210 down to the designation 234 representing a digital picture frame in "Ann's Room", causing the host's GUI to display the designation 234 enclosed within a border, thus indicating to the user that this designation 234 has been focused on. By selecting designation 234, the digital image associated with selected thumbnail 206 will be sent to the desired target, which in this example is a digital picture frame in Ann's Room.

The foregoing example is merely one example of a suitable GUI by which a destination for a selected digital media file can be chosen by a user. Many alternative user interfaces can be implemented, given the teachings of this "Detailed Description". In some embodiments, the user may select a plurality of names on the routing target menu 230, and all of those individuals or entities will receive the selected digital media file.

In another possible embodiment, a user could first right-click on a photo image 206, thus opening routing target menu 230, and the user could select one or more entries on the routing target menu 230. The user could then send the desired digital image associated with selected thumbnail 206 by clicking on a "Send" icon, by right-clicking, or by any other suitable GUI action.

Entries for the routing list or routing menu 230 are added when the sharing application software is initialized, and the menu is augmented when new appliances are registered with the host, or whenever communication with a new buddy is established.

Figure 8:
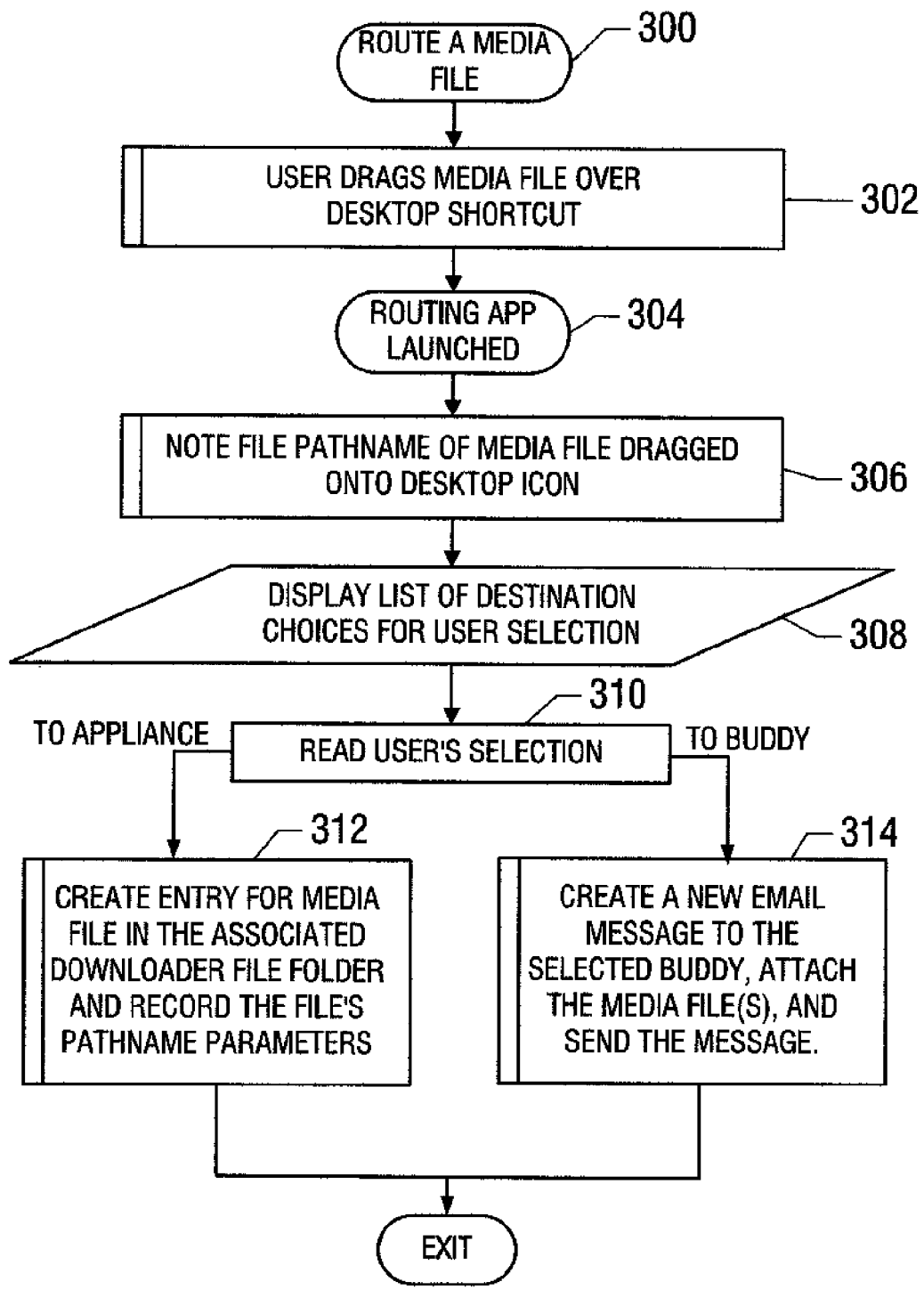
FIG. 8 is a flow diagram illustrating an exemplary method to route a media file via a desktop shortcut, in accordance with an embodiment of the present invention.

FIG. 8 is a flow diagram illustrating an exemplary method 300 to route a media file via a host desktop shortcut, in accordance with an embodiment of the present invention. In general, the method involves using a desktop shortcut to launch a file-routing application, displaying a list of potential destinations, and executing a destination choice, such as sending a file to a processor-based device like an appliance or electronically mailing or transmitting the file to a buddy's appliance.

In 302, a desktop shortcut is used to indicate that a particular file is to be sent. In this example, the particular file is dragged to and/or hovered over a desktop shortcut or drop spot, e.g. drop spot 220 in FIGS. 6-7.

In 304, a routing application is initiated or launched as a result of the action in 302.

In 306, the pathname of the digital image associated with the selected thumbnail is noted for the particular thumbnail file that was selected and dragged to and/or hovered over the desktop icon or drop spot.

In 308, a list of possible target destination choices is displayed, and the user selects at least one of the possible targets. In one embodiment, if a desired target does not appear on the list, the user may manually enter a destination.

In 310, the user's selection of a target is read. If the choice is to send the file to an appliance, the method goes to 312; if the choice is to send the file to a buddy, the method goes to 314.

In 312, an entry is created for the media file in an associated downloader file folder. The file's pathname parameters are recorded, and related information such as a time stamp and the sender's name may also be included. Optionally, the media content file can be reformatted, and the reformatted copy can be saved and noted into the downloader's entry log. It is possible for the software to format outgoing files in a device- and content-intelligent manner. The characteristics of various target types can be incorporated into the formatting software for this purpose.

Additionally, preferred formats for various targets can also be accessed. For example, a user may wish to post a new baby picture onto the family's DPF appliance. Prior to saving a megapixel resolution image, the software could down-sample it to match the capability of the appliance's display and convert it from a .BMP to a .JPG format.

Many other formatting examples can be imagined. For example, if a user wished to share the new baby picture with a friend, and to target the friend's image-enabled cell phone as the appliance, a different final image resolution would be appropriate, as would possibly a different file format.

In 314, a new email message is generated to the selected buddy. The selected media file, optionally reformatted, is attached to the email message, and the message is sent to the selected buddy.

While the above embodiment describes sending a single file to a single destination, in other embodiments it is possible to send more than one file at a time to multiple destinations.

Figure 9A:
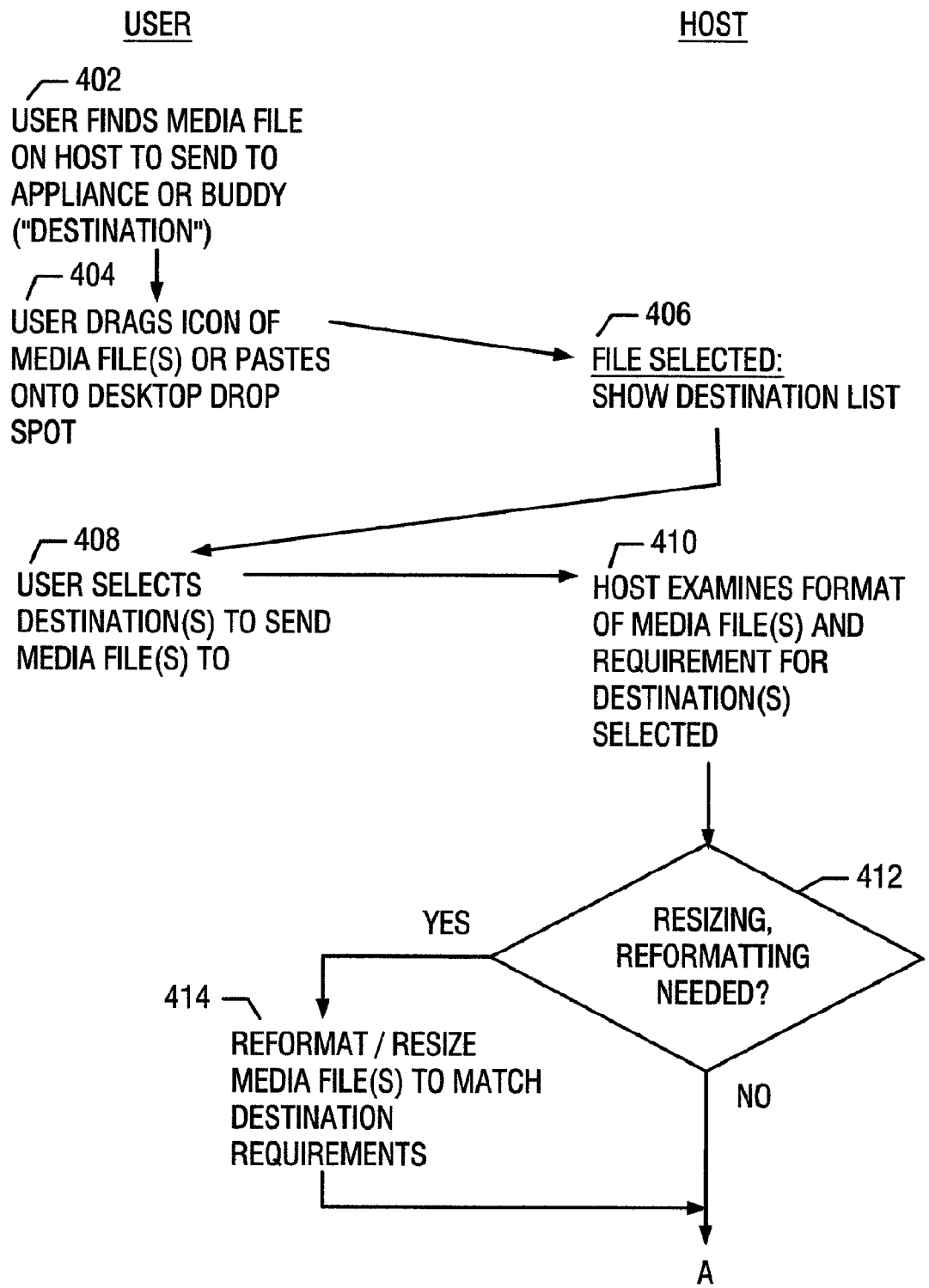
FIGS. 9A and 9B together constitute a flow diagram illustrating an exemplary method for a computer user to route a file via a desktop shortcut, in accordance with an embodiment of the present invention.
Figure 9B:
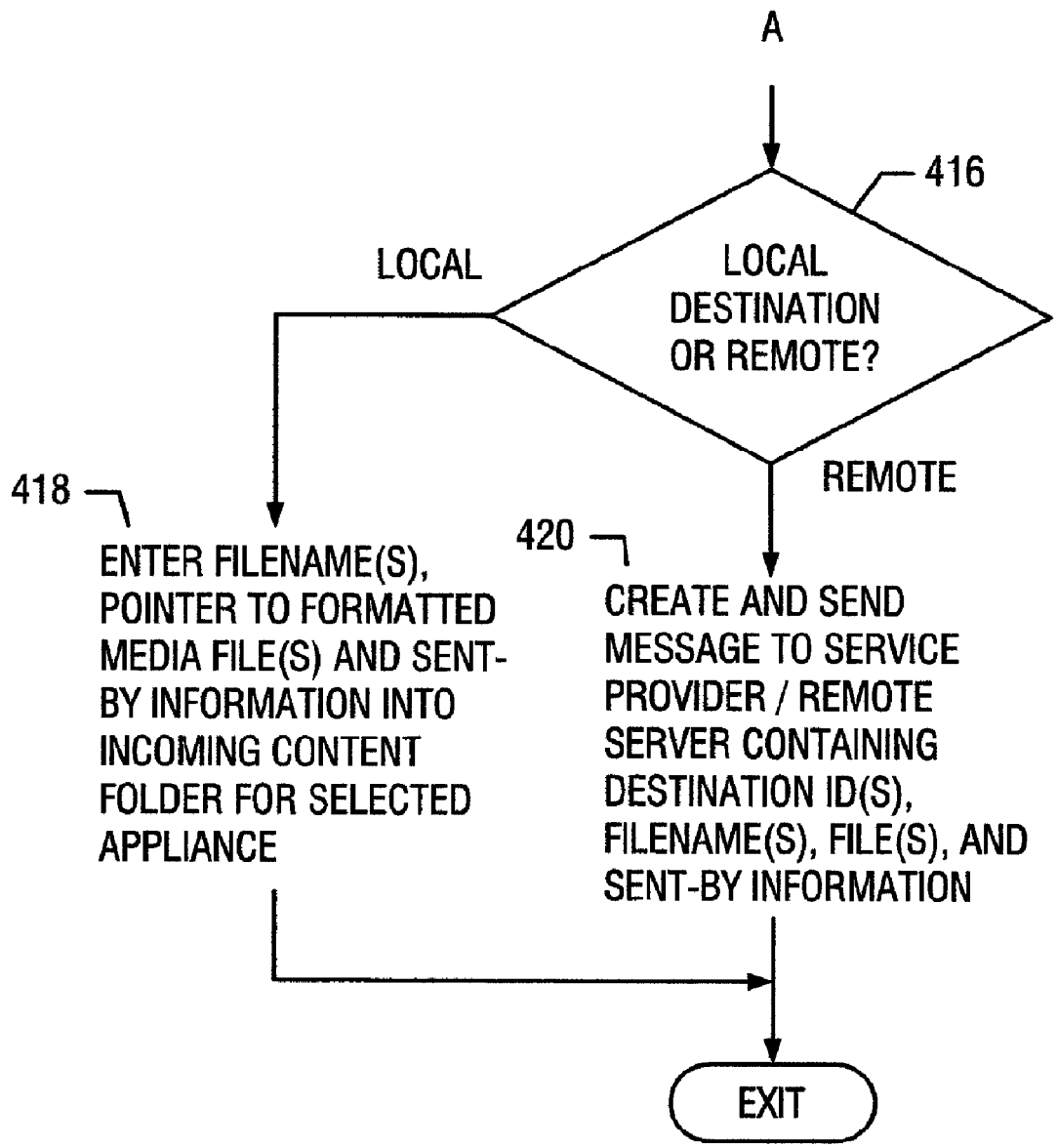

FIGS. 9A and 9B together constitute a flow diagram illustrating an exemplary method for a computer user to route a file via a desktop shortcut, in accordance with an embodiment of the present invention.

In 402 the user finds a desired media file, on a host computer, that the user desires to send to a destination. The destination can be any type of processor-based device, such as an appliance, a buddy's computer or Internet telephone, or the like. As part of finding the desired media file, the user could focus on the file, e.g. by hovering a cursor over the file.

In 404, the user selects the desired file by using a shortcut. In one embodiment, the user drags an image, thumbnail, or icon of the desired file across the desktop and pastes it onto a desktop drop spot icon. In one embodiment, the user can select multiple desired files, e.g. by "lassoing" them, and dragging the collection of desired files to the desktop drop spot.

In 406, now that the file has been selected, a list of possible destinations is displayed, e.g. in a pop-up window or other suitable GUI.

In 408, the user selects one or more destinations to receive the one or more media files.

In 410, the host examines the format of the selected media file(s) and compares the format to that of the selected destination(s). The host can store information concerning the communication resources (e.g. bandwidth, etc.) and other characteristics or resources (e.g. resolution, memory size, processor type, type of display and/or rendering circuitry, etc.) of each destination. The host determines whether the selected file(s) should be reformatted. If so, the method goes to 414; otherwise, it goes to 416.

In 414, the host reformats and/or resizes the media file(s) to match the communication, display, storage, and/or other requirements of the selected destination(s). The method then proceeds to 416.

In 416, the host determines whether the destination is local or remote, because in one embodiment files to be sent locally (e.g. to an appliance in local communication with the host) may be handled differently from files to be sent to a buddy at another host. If local, the method goes to 418; if remote, the method goes to 420.

In 418, various information concerning the file(s) is stored into an incoming content folder for the selected appliance. Such information can include the filename(s), a pointer to each formatted file, and sent-by information to identify the file sender.

In 420, a message (e.g. an email) is created and sent to the remote host. In one embodiment, the message is sent to a service provider and/or to a remote server. The message can contain relevant information concerning the file(s) and the destination(s). This information can include the filename(s), destination ID(s), the file(s) and sent-by information. The service provider and/or remote server subsequently dispatches the file(s) to the desired destination(s).

Figure 10:
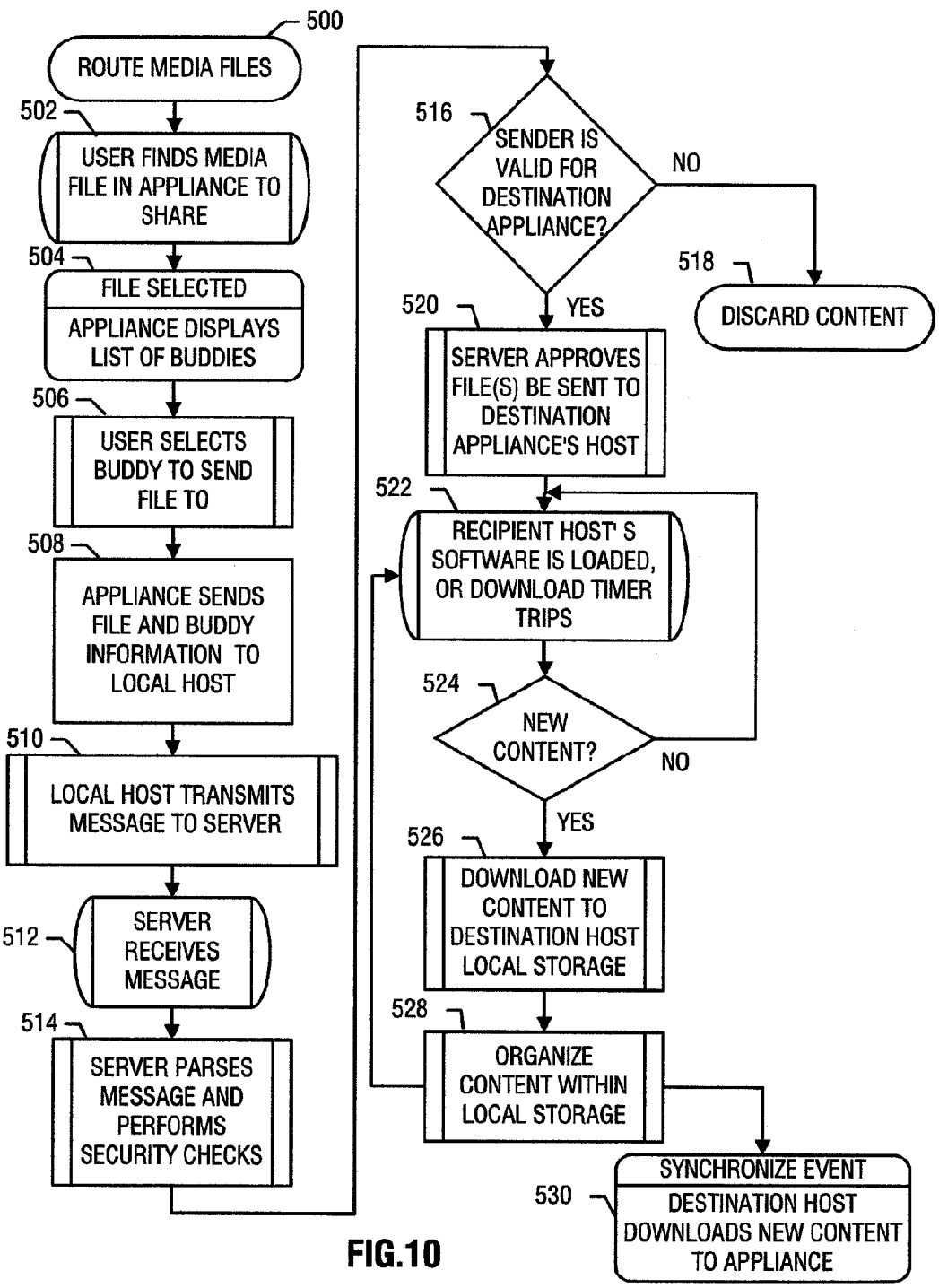
FIG. 10 is a flow diagram illustrating an exemplary method to route one or more media files from an appliance to a destination processor-based device in a network via an intermediary processor-based device, in accordance with an embodiment of the present invention.

FIG. 10 is a flow diagram illustrating an exemplary method 500 to route one or more media files from an appliance to a destination processor-based device in a network via an intermediary processor-based device, in accordance with an embodiment of the present invention. Method 500 can be used, for example, when a user of an appliance desires to send one or more media files to another user of an appliance, or to another user operating a host, or to any computer coupled to the same network.

In 502, an appliance user finds one or more media files that the user desires to send to or share with another user in a network. The user can select the desired one or more media files in any suitable manner, including using a desktop drop spot, as described elsewhere herein.

In 504, with the file having now been selected by the appliance user, a list of possible destinations, such as a buddy list, is presented to the appliance user.

In 506, the appliance user selects one or more buddies to send the file(s) to.

In 508, the appliance sends the file(s) and the buddy destination(s) to a host computer with which the appliance is in communication. In one example, the appliance could be digital picture frame 10 (FIG. 1), and the local host to which digital picture frame 10 is coupled could be host 20 (FIG. 1). In this example, the local host serves as an intermediary processor-based device.

Still referring to FIG. 10, in 510, the local host transmits the file(s) with a message to a network server. The network server could be any server in the network, e.g. server 134 (FIG. 5).

Still referring to FIG. 10, in 512, the server receives the message from the local host.

In 514, the server parses the message to determine various information concerning its origin, its destination, its associated file(s), etc. The server may perform security checks on the message.

In 516, the server checks whether the sender of the file(s) is a valid sender for the destination device, e.g. a buddy's appliance. If the sender is valid, the method goes to 520; otherwise, it goes to 518, where the message content is discarded.

In 520, the server approves transmitting the file(s) for storage on a host associated with the destination appliance. The destination host and associated appliance(s) can be similar or identical to those shown in FIGS. 1 and 12 (discussed below)

In 522, before the file(s) are downloaded to the destination host, an optional operation can check that certain conditions exist. For example, one condition could be that the recipient host has proper software loaded for handling the download. Another condition could be whether a download timer has tripped.

In 524, the method checks whether there is new content in the file(s) that the server has approved for downloading to the destination host. If so, the method goes to 526; otherwise, the method returns to 522.

In 526, the content of the transmitted file(s) is downloaded to the local storage resource of the destination host.

In 528, the content of the transmitted file(s) is organized within the local storage of the destination host, e.g. a database of digital media files.

In 530, a synchronize event occurs during which the destination host downloads the new content of the transmitted file(s) to the destination appliance. This event typically occurs asynchronously at periodic download times or when the user of the destination appliance requests it.

Figure 11:
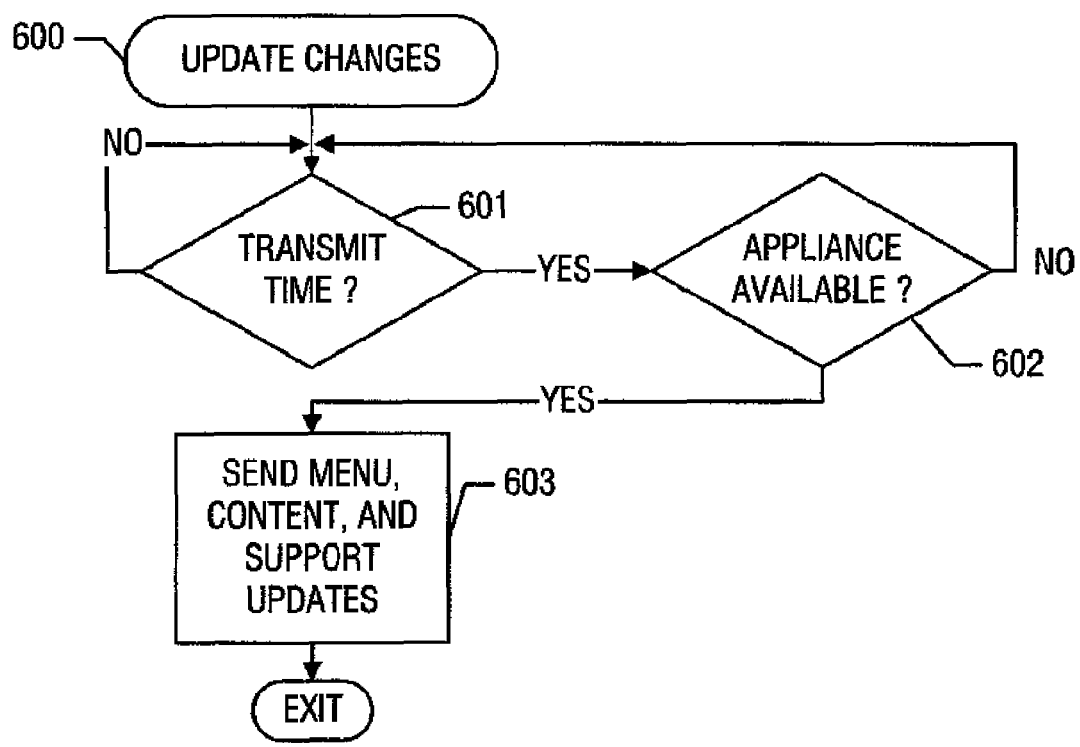
FIG. 11 is a flow diagram illustrating an exemplary method for a host to update or synchronize with an appliance, in accordance with an embodiment of the present invention.

FIG. 11 is a flow diagram illustrating an exemplary method 600 for a host to update or synchronize with an appliance, in accordance with an embodiment of the present invention. As a result of synchronization, the host updates the appliance with any menu or content item changes residing on the host. Such updates can occur automatically or upon command from the host or appliance.

At 601, a determination is made whether a scheduled transmit time has occurred. If so, the method goes to 602; otherwise, it loops back to the beginning of 601.

At 602, a determination is made whether the appliance is turned on and within range. If so, the method goes to 603; otherwise, it loops back to the start of 601.

At 603, the host sends any updates to menu items, content items, or support items. Support items can include a new software or driver release to provide one or more functions or characteristics that the appliance did not previously have, or an updated version thereof.

A new function could be accompanied by a new menu item for display on the appliance, e.g. a printing icon denoting a printing action that the user can command to occur on a selected file at the host. The host can deliver a new menu template to support a new function or capability, thereby altering or expanding the feature set for the user automatically. This capability overcomes many of the existing limitations of product shipping readiness and competitiveness for manufacturers. The method exits at 805.

Figure 12:
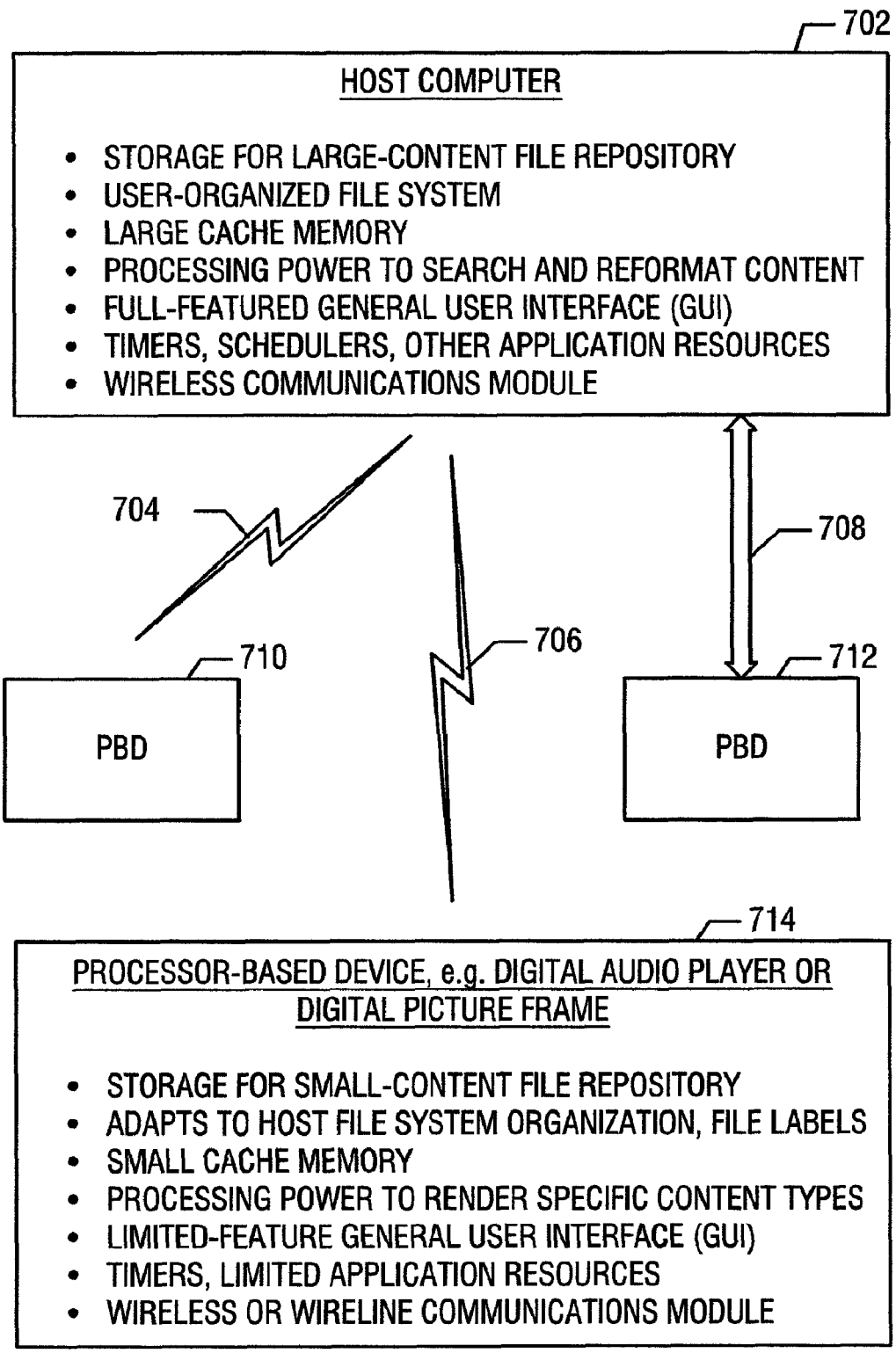
FIG. 12 is a block diagram of a network comprising a host and one or more processor-based devices or appliances, in accordance with one embodiment of the present invention.

FIG. 12 is a block diagram of a network comprising a host computer 702 and one or more processor-based devices or appliances 710, 712, and 714, in accordance with one embodiment of the present invention. As illustrated in FIG. 12, a host 702 can communicate menu items and content items with one or more processor-based devices, such as appliances 710, 712, and 714.

Host 702 generally comprises greater resources, and/or larger and more full-featured resources, than an individual processor-based appliance 710, 712, or 714. For example, host 702 can include storage for a large-content file repository that contains many digital media files of any type. Host 702 can also include a file structure or system that is organized by a host user. As one example, many personal computer users use the large storage capacity of their personal computers to store digital media files, after downloading such files from the Internet, from digital cameras, or from other media players, or after receiving them via email. Computer users typically establish a preferred, customized file hierarchy on their personal computers. Embodiments of the present invention offer significant flexibility in accommodating computer users' pre-existing file hierarchies, thus providing an advantage over other products that are incapable of doing so.

Host 702 can further comprise a large cache memory. Host 702 can also include fairly significant processing power to search for and reformat digital content items, whether in its local memory or on a network such as the Internet. Host 702 can also include a full-featured general user interface (GUI), as well as a number of timers, schedulers, and other application resources. Host 702 may also include a wireless communications module, including for example a radio-frequency (RF) or infra-red (IR) transceiver module.

In the example shown in FIG. 12, host 702 can communicate wirelessly with processor-based device 710 and processor-based device 714 via wireless links 704 and 706, respectively. Host 702 can communicate via a cable or wire 708 with processor-based device 712.

A processor-based device generally comprises fewer resources, and/or smaller and less full-featured resources, than a host. For example, processor-based device 714 can include storage for a small-content file repository that may contain a limited number of digital media files. The file system organization of processor-based device 714 can adapt to that of the host, including the file names or labels of the host. Processor-based device 714 could have a small cache memory and only sufficient processing power to render specific content types. For example, a DPF could have a processor that renders only digital photo files. Processor-based device 714 could have a limited-feature GUI, as well as a number of timers, schedulers, and other rather limited application resources. Processor-based device 714 may also include a wireless or wireline communications module or element, including for example a radio-frequency (RF) or infra-red (IR) transceiver module or element.

In a network or system comprising a host computer and at least one processor-based appliance, resources can be optimally divided in a suitable division of labor and/or partitioning of responsibility. For example, in an embodiment where the host serves as a repository for a large number of digital media files, the storage capacity of the processor-based appliances can be reduced to a reasonable capacity that can store a reasonable number of files, thus minimizing the cost and complexity of the processor-based appliances.

The operations described above with respect to the methods illustrated in FIGS. 8-11 can be performed in a different order from those described herein. Also, it will be understood that while an "exit" block is shown in certain of the method figures, these methods can be performed continuously in a run-time environment.

Embodiments of the present invention enable the users of processor-based devices to exchange digital media files easily. Thus, users' enjoyment and utilization of processor-based devices can be significantly enhanced, making such processor-based devices more commercially desirable.

In some embodiments, media files can be transferred from one processor-based device to another using a simple desktop shortcut. In one embodiment, for example, one or more desired media files can be dragged to a desktop drop spot and routed to one or more desired recipients anywhere, provided that the recipients' processor-based devices are communicatively coupled to the sender's processor-based device.

In some embodiments, one or more media files can be transferred from one appliance, such as a DPF, to another appliance anywhere, provided that the appliances are communicatively coupled via a network. In certain embodiments, the network can be the Internet.

By using the software-implemented methods of embodiments of the present invention, many types of processor-based devices such as, but not limited to, digital appliance and DPFs become more commercially attractive.

As shown herein, the present invention can be implemented in a number of different embodiments, including various methods, an appliance, and an article comprising a machine-accessible medium having associated instructions. Other embodiments will be readily apparent to those of ordinary skill in the art. The elements, algorithms, and sequence of operations can all be varied to suit particular requirements.

In view of the disclosure herein, it will be apparent to those skilled in the art how to write suitable software routines that implement the functions, features, and GUI discussed above.

The illustrated architecture of the processor-based devices and the hosts described herein are only examples of possible architectures. Embodiments of the present invention are in no way limited to any particular architecture for the processor-based devices or the hosts.

FIGS. 1 through 7 are merely representational and are not drawn to scale. Certain proportions thereof may be exaggerated, while others may be minimized. FIGS. 1-12 illustrate various embodiments of the invention that can be understood and appropriately carried out by those of ordinary skill in the art.

Although specific embodiments have been illustrated and described herein, it will be appreciated by those of ordinary skill in the art that any arrangement or process that is calculated to achieve the same purpose may be substituted for the specific embodiments shown. This application covers any adaptations or variations of embodiments of the present invention. Therefore, it is manifestly intended that embodiments of this invention be limited only by the claims and the equivalents thereof.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description with each claim standing on its own as a separate preferred embodiment.

What is claimed is:

1. An article comprising a machine-accessible non-transitory medium having associated instructions, wherein the instructions, when accessed, result in a machine performing:
    storing a plurality of digital media files on a host, wherein at least a first one of the digital media files has a first file extension type, and wherein at least a second one of the digital media files has a second file extension type;
    displaying a thumbnail representation of at least one of the digital media files on a desktop of the host;
    detecting a presence of the thumbnail representation hovering over a drop spot of the desktop;
    receiving a user command to transfer the at least one digital media file; and if the at least one digital media file has the first file extension type, transferring the at least one digital media file to one of a first sub-group of targets, and if the at least one digital media file has the second file extension type, transferring the at least one digital media file to one of a second sub-group of targets.

2. The article recited in claim 1 wherein, in transferring, the at least one digital media file is transferred to a destination processor-based device, and wherein the destination processor-based device is one of a server, a second host, an appliance, and a digital picture frame.

3. The article recited in claim 2 wherein, in transferring, information is stored concerning characteristics of the destination processor-based device.

4. The article recited in claim 3 wherein, in transferring, the information is used to modify the at least one digital media file prior to transferring.

5. The article recited in claim 2 wherein, in transferring, the at least one digital media file is transferred to the destination processor-based device via an intermediary processor-based device.

6. The article recited in claim 5 wherein the machine comprises a processor and wherein, in transferring, the digital media file is wirelessly transmitted to the intermediary processor-based device via a transceiver coupled to the processor in accordance with ones of the instructions.

7. The article recited in claim 5 wherein, in transferring, the at least one digital media file is wirelessly transmitted to the intermediary processor-based device.

8. The article recited in claim 5 wherein, in transferring, the intermediary processor-based device comprises a second host.

9. The article recited in claim 8 wherein, in transferring, the at least one digital media file is modified by the second host to satisfy performance characteristics of the destination processor-based device.

10. The article recited in claim 8 wherein, in transferring, the at least one digital media file is transferred from the second host to a network server before being transferred to the destination processor-based device.

11. The article recited in claim 10 wherein, in transferring, the network server performs a security check, and wherein the security check comprises a comparison with a list of authorized buddies.

12. The article recited in claim 10 wherein, in transferring, the at least one digital media file is transferred from the network server to a third host before being transferred to the destination processor-based device.

13. The article recited in claim 12 wherein, in transferring, at least one of the second host, the network server, and the third host stores information concerning characteristics of the destination processor-based device, and wherein at least one of the second host, the network server, and the third host uses the information to modify the at least one digital media file.

14. The article recited in claim 8 wherein, in transferring, the at least one digital media file is transferred from the second host to a network server before being transferred to the destination processor-based device.

15. The article recited in claim 14 wherein, in transferring, the network server is to perform a security check, and wherein the security check comprises a comparison with a list of authorized buddies.

16. The article recited in claim 14 wherein, in transferring, the digital media file is transferred from the network server to a third host before being transferred to the destination processor-based device.

17. The article recited in claim 2 wherein, in transferring, the digital media file is transferred to a second host, and wherein the at least one digital media file is transferred from the second host to the destination processor-based device during a synchronization event.

18. The article recited in claim 17 wherein the machine comprises a processor and wherein, in transferring, information concerning characteristics of the destination processor-based device is stored in a memory coupled to the processor.

19. The article recited in claim 1 wherein, in transferring, the at least one digital media file is transferred to a second host, and wherein the instructions, when accessed, further result in a machine performing:

transferring the at least one digital media file from the second host to one of an appliance and a digital picture frame during a synchronization event.

20. The article recited in claim 1 wherein, in receiving, a pathname is determined for the at least one digital media file.

21. The article recited in claim 1 wherein, in displaying, a display is to display at least one menu of potential digital media file destinations in the form of a buddy list.

22. The article recited in claim 1 wherein the machine comprises a processor and wherein the processor is part of an apparatus that comprises one of a digital picture frame, an Internet appliance, a personal digital assistant, a cellular telephone, a pager, a music reproduction device, and a hand-held computer.

23. The article recited in claim 1 wherein the machine comprises a processor and wherein, in transferring, ones of the instructions, when executed, enable the processor to determine a pathname of the at least one digital media file corresponding to the thumbnail dragged over and dropped upon the drop spot.

24. The article recited in claim 1 wherein, in transferring, the at least one digital media file is transferred to a destination processor-based device, and wherein the destination processor-based device is one of a digital picture frame, an Internet appliance, a personal digital assistant, a cellular telephone, a pager, a music reproduction device, and a hand-held computer.

* * * * *

UNITED STATES PATENT AND TRADEMARK OFFICE
CERTIFICATE OF CORRECTION

| | | |
|---|---|---|
| PATENT NO. | : 8,150,911 B2 | Page 1 of 1 |
| APPLICATION NO. | : 12/902104 | |
| DATED | : April 3, 2012 | |
| INVENTOR(S) | : Cynthia S. Bell et al. | |

It is certified that error appears in the above-identified patent and that said Letters Patent is hereby corrected as shown below:

On the face page, in field (56), under "Other Publications", in column 2, line 1, before "Polling" delete """,".

On page 3, under "Other Publications", in column 1, line 43, delete "Restrication" and insert -- Restriction --, therefor.

On page 3, under "Other Publications", in column 2, line 5, delete "suported" and insert -- supported --, therefor.

On page 3, under "Other Publications", in column 2, line 46, delete "of he" and insert -- of the --, therefor.

Signed and Sealed this
Third Day of July, 2012

David J. Kappos
*Director of the United States Patent and Trademark Office*